(12) United States Patent
Yadav et al.

(10) Patent No.: US 10,376,822 B2
(45) Date of Patent: Aug. 13, 2019

(54) FILTER ELEMENT, AIR CLEANER, AND METHODS

(71) Applicant: Donaldson Company, Inc., Minneapolis, MN (US)

(72) Inventors: Rakesh Yadav, New Market, MN (US); Suresh Bommineni, Shakopee, MN (US); Benny K. Nelson, Bloomington, MN (US); Daniel E. Adamek, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 618 days.

(21) Appl. No.: 14/905,701

(22) PCT Filed: Jul. 18, 2014

(86) PCT No.: PCT/US2014/047293
§ 371 (c)(1),
(2) Date: Jan. 15, 2016

(87) PCT Pub. No.: WO2015/010085
PCT Pub. Date: Jan. 22, 2015

(65) Prior Publication Data
US 2016/0177891 A1      Jun. 23, 2016

Related U.S. Application Data

(60) Provisional application No. 61/856,467, filed on Jul. 19, 2013.

(51) Int. Cl.
*B01D 46/00* (2006.01)
*B01D 46/52* (2006.01)
(Continued)

(52) U.S. Cl.
CPC ..... *B01D 46/0005* (2013.01); *B01D 46/0024* (2013.01); *B01D 46/2411* (2013.01);
(Continued)

(58) Field of Classification Search
CPC .......... B01D 39/1623; B01D 2239/065; B01D 2275/10; B01D 46/2411; B01D 46/2414;
(Continued)

(56) References Cited

U.S. PATENT DOCUMENTS 3,488,928 A    1/1970  Tarala
5,547,480 A    8/1996  Coulonvaux
(Continued)

FOREIGN PATENT DOCUMENTS

DE          10235275 A1     2/2004
DE       202008017059 U1    5/2010
(Continued)

OTHER PUBLICATIONS

International Search Report for PCT/US2014/047293, dated Mar. 5, 2015.
(Continued)

*Primary Examiner* — Robert Clemente
(74) *Attorney, Agent, or Firm* — Merchant & Gould P.C.

(57) ABSTRACT

A filter element is provided according to the present invention. The filter element includes: (a) a media pack arrangement having first and second opposite ends, said media pack arrangement comprising: (i) an inner liner defining a safety central open volume; (ii) a multilayer laminate media construction circumscribing the inner liner and having a first end and a second end, wherein the multilayer laminate media construction comprises: (A) a filtration media layer arranged in a waved configuration, wherein the filtration media layer has a first side and a second side; (B) a first fibrous support layer adjacent the first side of the filtration
(Continued)

media layer arranged in the waved configuration; (b) a first end cap at the first end of the media pack arrangement; said first end cap having a central aperture in flow communication with said safety central open volume; and (c) a second end cap at the second end of the media pack arrangement; said second end cap being a closed end cap. An air cleaner is provided, and a media pack is provided.

14 Claims, 25 Drawing Sheets

(51) Int. Cl.
    *B01D 46/24*     (2006.01)
    *B01D 46/54*     (2006.01)
    *F02M 35/02*     (2006.01)
    *F02M 35/024*     (2006.01)

(52) U.S. Cl.
    CPC ....... *B01D 46/2414* (2013.01); *B01D 46/521* (2013.01); *B01D 46/523* (2013.01); *B01D 46/543* (2013.01); *F02M 35/0201* (2013.01); *F02M 35/0214* (2013.01); *F02M 35/0245* (2013.01); *F02M 35/02483* (2013.01); *B01D 2271/027* (2013.01); *B01D 2275/10* (2013.01)

(58) Field of Classification Search
    CPC ............ B01D 46/0005; B01D 46/0024; B01D 46/521; B01D 46/523; B01D 46/543; F02M 35/0245; F02M 35/02483; F02M 35/0214
    See application file for complete search history.

(56) References Cited

U.S. PATENT DOCUMENTS

| | | |
|---|---|---|
| 5,613,992 A | 3/1997 | Engel |
| 5,755,842 A | 5/1998 | Patel et al. |
| 5,772,883 A | 6/1998 | Rothman et al. |
| 5,792,247 A | 8/1998 | Gillingham et al. |
| 5,800,581 A | 9/1998 | Gielink et al. |
| 5,820,646 A | 10/1998 | Gillingham et al. |
| 6,039,778 A | 3/2000 | Coulonvaux |
| 6,051,042 A | 4/2000 | Coulonvaux |
| 6,099,606 A | 8/2000 | Miller et al. |
| 6,165,572 A | 12/2000 | Kahlbaugh et al. |
| 6,179,890 B1 | 1/2001 | Ramos et al. |
| 6,235,195 B1 | 5/2001 | Tokar |
| 6,652,614 B2 | 11/2003 | Gieseke et al. |
| 6,673,136 B2 | 1/2004 | Gillingham et al. |
| 7,070,642 B2 | 7/2006 | Scott et al. |
| 8,066,791 B2 | 11/2011 | Baseotto et al. |
| 8,177,872 B2 | 5/2012 | Nelson et al. |
| 8,257,459 B2 | 9/2012 | Healey et al. |
| 8,480,778 B2 | 7/2013 | Baseotto et al. |
| 8,864,866 B2 | 10/2014 | Osendorf et al. |
| 8,888,882 B2 | 11/2014 | Ackermann et al. |
| 9,238,189 B2 | 1/2016 | Baseotto et al. |
| 9,320,997 B2 | 4/2016 | Campbell et al. |
| 2004/0187689 A1 | 9/2004 | Sporre et al. |
| 2005/0130508 A1 | 6/2005 | Yeh |
| 2006/0107639 A1* | 5/2006 | Hamlin ............... B01D 29/21 55/498 |
| 2008/0282890 A1 | 11/2008 | Rocklitz et al. |
| 2009/0127211 A1 | 5/2009 | Rocklitz et al. |
| 2010/0032365 A1 | 2/2010 | Moe et al. |
| 2010/0107881 A1 | 5/2010 | Healey et al. |
| 2014/0144112 A1 | 5/2014 | Campbell et al. |
| 2016/0236128 A1 | 8/2016 | Campbell et al. |
| 2016/0288039 A1 | 10/2016 | Baseotto et al. |

FOREIGN PATENT DOCUMENTS

| | | |
|---|---|---|
| EP | 0139822 A2 | 5/1985 |
| EP | 0329659 B1 | 4/1995 |
| EP | 1043056 A2 | 10/2000 |
| WO | WO 99/42719 A2 | 8/1999 |
| WO | WO 2004/007054 A1 | 1/2004 |
| WO | WO 2004/007927 A2 | 1/2004 |
| WO | WO 2004/082795 A2 | 9/2004 |
| WO | WO 2005/063361 A1 | 7/2005 |
| WO | WO 2005/077487 A1 | 8/2005 |

OTHER PUBLICATIONS

Communication pursuant to Article 94(3) EPC for European Patent Application No. 14747487.8, dated Apr. 4, 2019.

* cited by examiner

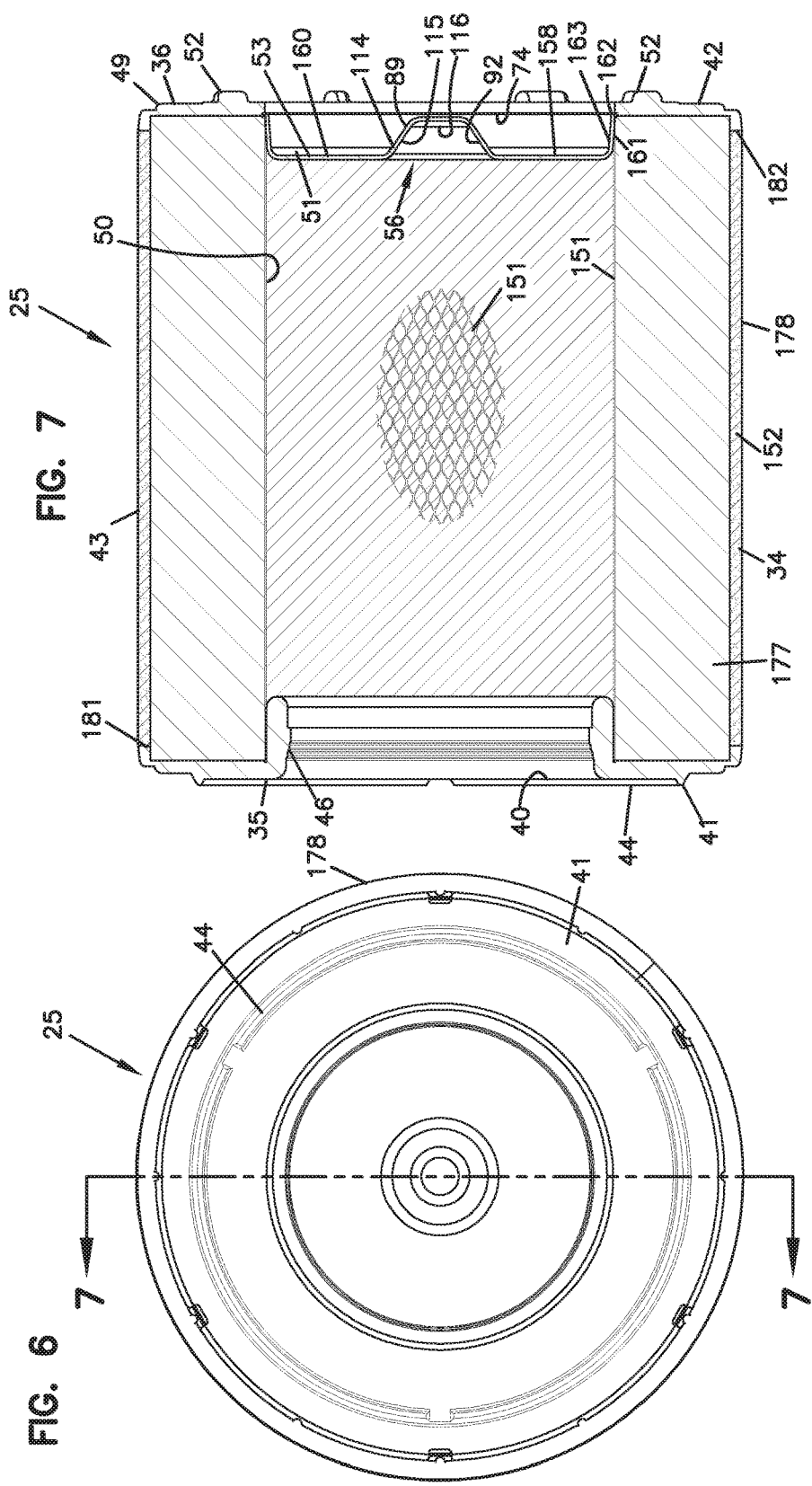

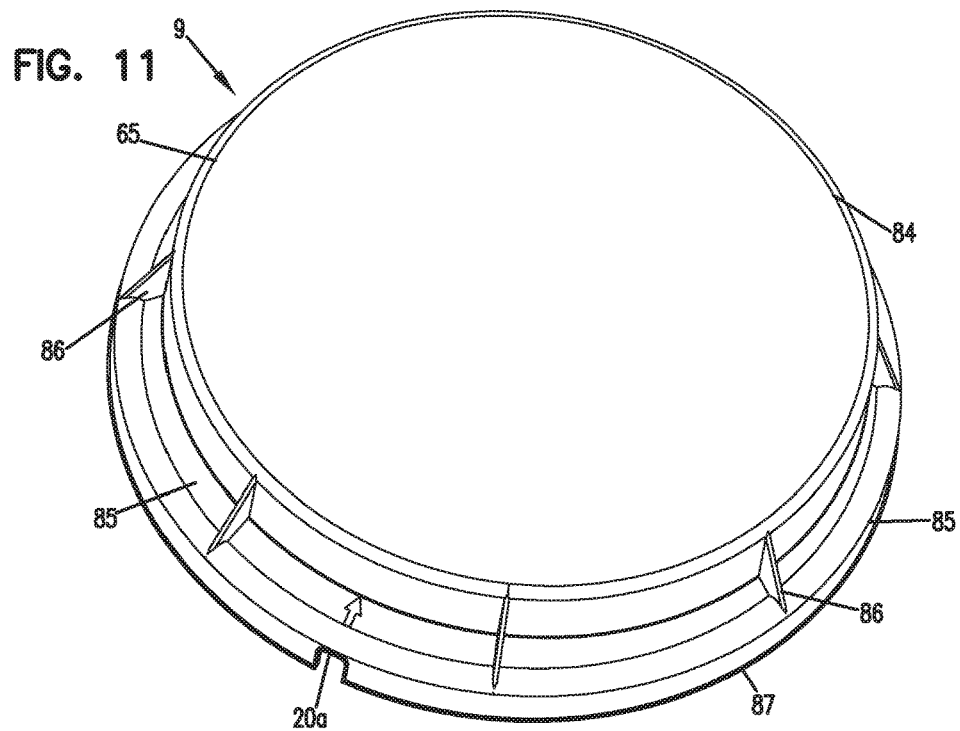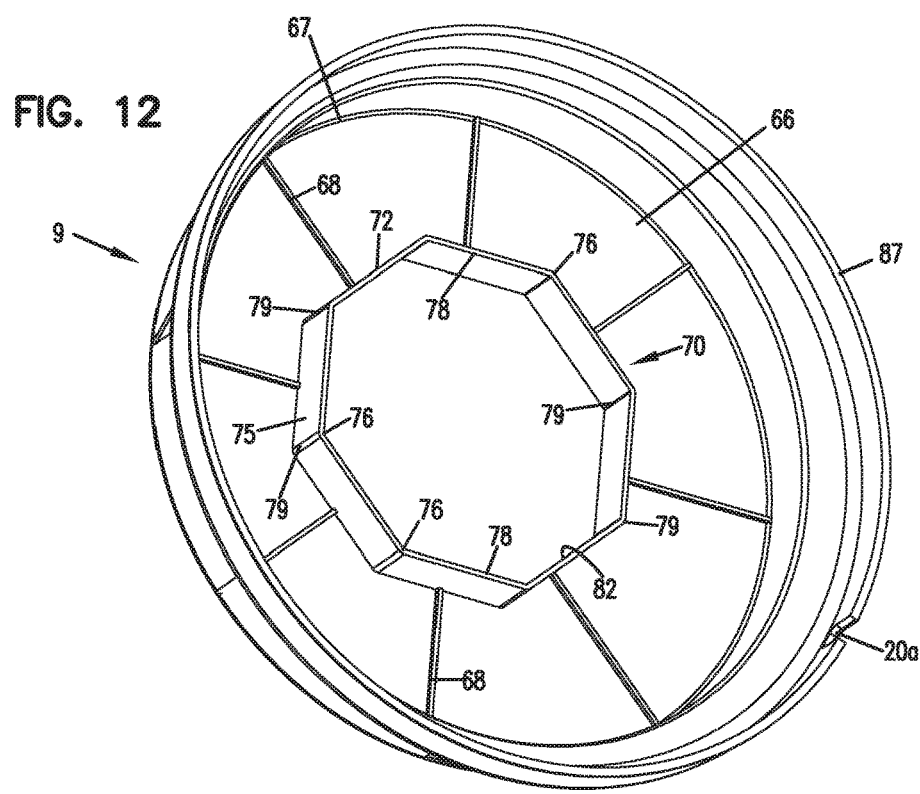

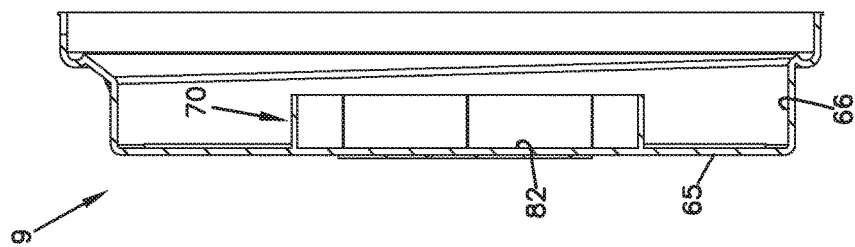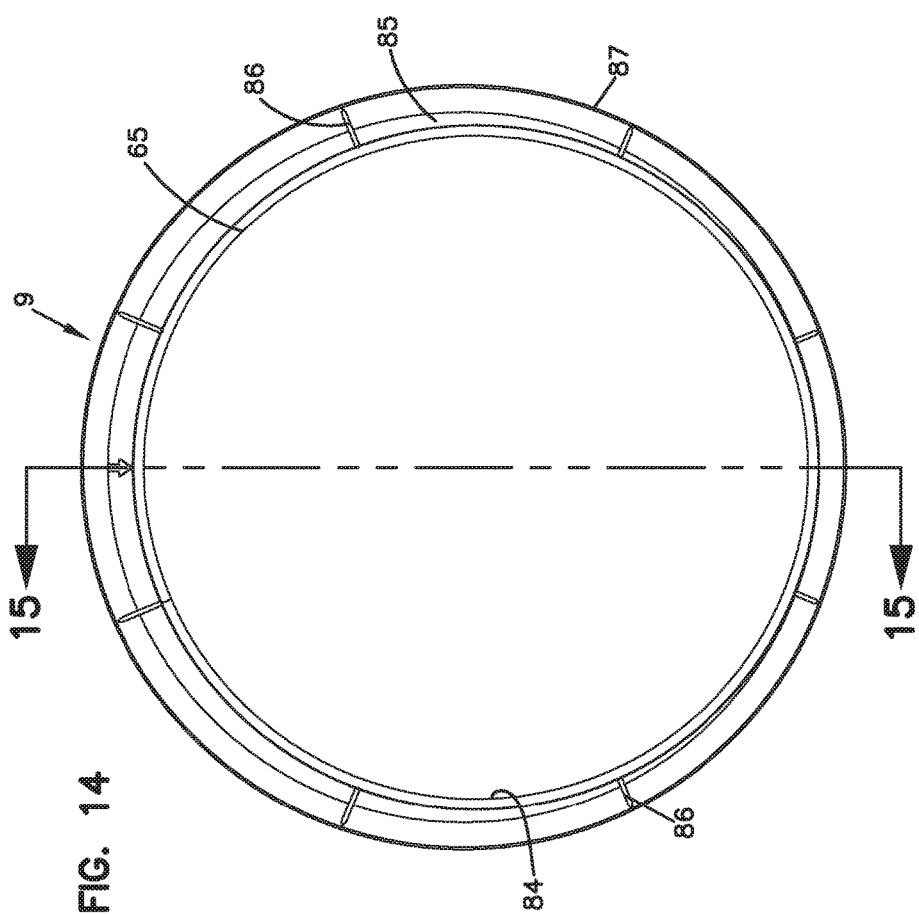

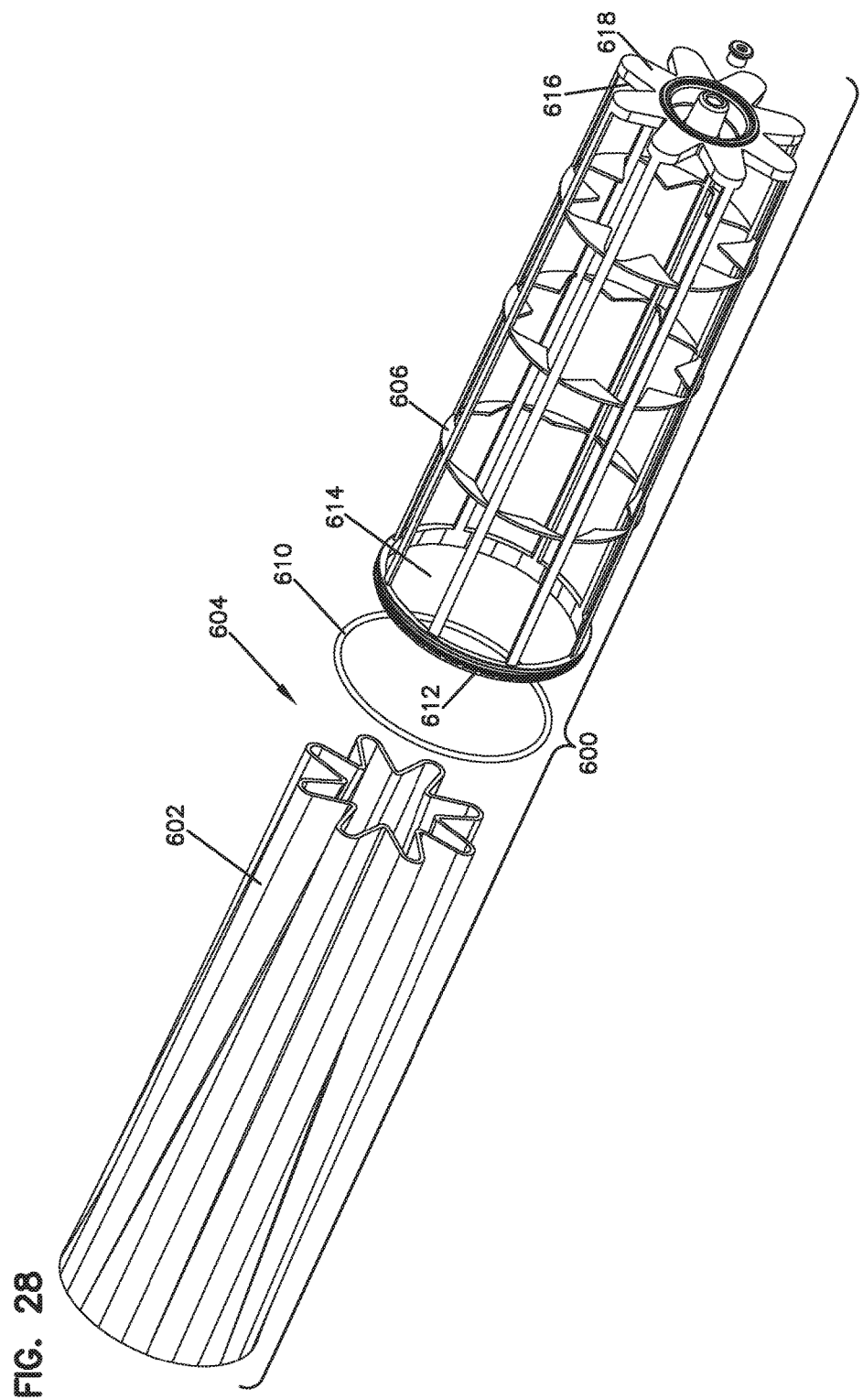

FILTER ELEMENT, AIR CLEANER, AND METHODS

This application is being filed on Jan. 15, 2016, as a US National Stage application of PCT International Patent application No. PCT/US2014/047293, filed Jul. 18, 2014, which claims priority to U.S. Provisional patent application Ser. No. 61/856,467, filed Jul. 19, 2013, which applications are incorporated herein by reference. To the extent appropriate, a claim of priority is made to each of the above disclosed applications.

TECHNICAL FIELD

The present invention relates to filter elements and air cleaners. It particularly concerns filter elements and air cleaners for air intake systems of combustion engines and/or air compressor systems. In a typical application, the air cleaner will be used in association with the air intake system for equipment such as off road machinery (track-type tractors; truck loaders; skid steer loaders; pipelayers; excavators; material handlers; wheeled excavators; front shovels; forest machines; track skidders; drum compactors (soil or asphalt); pneumatic compactors; asphalt pavers; soil stabilizers; cold planers; VFS trailers; wheel loaders; telescopic handlers; integrated tool carriers; wheel tractors; landfill compactors; soil compactors; backhoe loaders; articulated trucks; off highway trucks and tractors; scrapers; motor graders; wheel skidders; and generator sets), farm equipment (tractors, combines), on mining equipment (ore haulers). The invention also concerns air filter elements, for such systems, and methods of assembly and use.

BACKGROUND

In general, the machinery vehicles or other equipment that operate with internal combustion engines require filtration systems for the air intake to the engine. Such air filtration arrangements, typically referenced by the term "air cleaner", are generally positioned to separate dust and other components from the air as it is drawn into the engine. Air cleaners typically include a housing and a replacement filter element arrangement. Typically, the air cleaners are designed such that the filter elements can be removed and replaced.

Air compressor systems typically include two air lines that need filtration: the intake air to the engine; and, the intake air to the compressed air storage. Air cleaners are desirable for these systems as well.

In general, improvement in air cleaners for such systems have been desired.

SUMMARY OF THE DISCLOSURE

A filter element is provided according to the present invention. The filter element includes: (a) a media pack arrangement having first and second opposite ends, said media pack arrangement comprising: (i) an inner liner defining a safety central open volume; (ii) a multilayer laminate media construction circumscribing the inner liner and having a first end and a second end, wherein the multilayer laminate media construction comprises: (A) a filtration media layer arranged in a waved configuration, wherein the filtration media layer has a first side and a second side; (B) a first fibrous support layer adjacent the first side of the filtration media layer arranged in the waved configuration; (b) a first end cap at the first end of the media pack arrangement; said first end cap having a central aperture in flow communication with said safety central open volume; and (c) a second end cap at the second end of the media pack arrangement; said second end cap being a closed end cap.

An air cleaner is provided according to the present invention. The air cleaner includes: a housing having an outer wall, and open end for insertion and removal of a primary filter element and a secondary filter element, and an air flow outlet tube; (b) a primary filter element positioned within the housing and comprising: (i) a media pack having first and second, opposite, ends; said media pack defining a central open volume; (ii) a first end cap at said first end of said media pack; said first end cap having a central aperture in flow communication with said central open volume; (iii) a closed end cap at said second end of said media pack; said closed second end cap having a closed central region; (c) a safety filter element positioned within the central open volume of the primary filter element, the safety filter element comprising a media pack arrangement having first and second opposite ends, said media pack arrangement comprising a multilayer laminate media construction provided in a closed loop configuration and defining a safety central open volume, and having a first end and a second end; and (d) an air cleaner access cover removably positioned over the housing open end.

A filter pack is provided according to the present invention. The pleated media pack includes (a) filter media provided in a pleated configuration comprising alternating first and second pleat tips, and pleat faces extending between the alternating first and second pleat tips; and (b) multilayer laminate media construction extending between, and forming, the alternating first and second pleat tips, the multilayer laminate media construction comprising: (i) a filtration media layer arranged in a waved configuration, wherein the filtration media has a first side and a second side; (ii) a first fibrous support layer adjacent the first side of the filtration media layer; (iii) a first scrim layer having a first side and a second side and wherein the scrim layer first side faces the first fibrous support layer; and (iv) a first fibrous outer layer adjacent the second side of the first scrim layer.

Methods for installing a filter element in an air cleaner preferably will use constructions as described herein. Methods for changing the filter element will also preferably use constructions as described herein. Methods for cleaning air are provided.

BRIEF DESCRIPTION OF THE DRAWINGS

FIG. 6 is an end elevational view of the primary filter element depicted in FIG. 4, and showing the opposite end as that shown in FIG. 5.

FIG. 7 is a cross-sectional view of the primary filter element depicted in FIGS. 4-6, the cross-section taken along the line 7-7 of FIG. 6.

FIG. 11 is a perspective view of the outer portion of the end cover of the air cleaner.

FIG. 12 is a perspective view of the inside of the end cover for the air cleaner.

FIG. 14 is a bottom plan view of the end cover shown in FIGS. 12 and 13.

FIG. 15 is a cross-sectional view of the end cover depicted in FIGS. 11-14, the cross-section being taken along the line 15-15 in FIG. 14.

FIG. 28 shows an exploded view of a pleated media pack with a spacer.

DETAILED DESCRIPTION

I. Air Filtration Systems—Generally

In general, air filtration systems for such equipment as off-road equipment, farm equipment, mining equipment and over the highway trucks, include two removable and replaceable filter elements, mounted inside an installed air cleaner housing. In many systems, the first filter element is positioned as an upstream or primary element, and the second filter element is positioned as a downstream, secondary or safety element.

Figure 1:
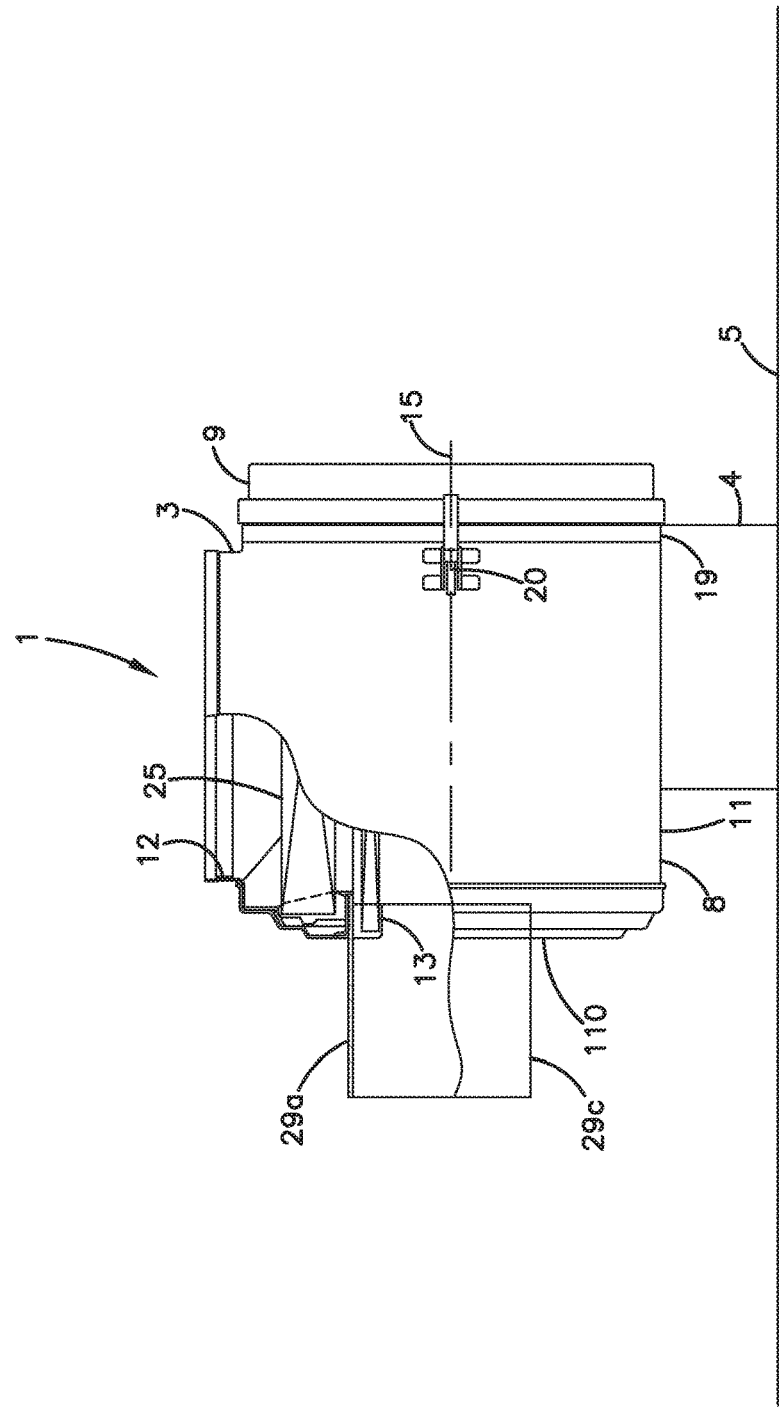
FIG. 1 is a side elevational, partially fragmented, schematic view of an air cleaner mounted on an air flow tube on an air intake system.

Attention is directed to FIG. 1, wherein certain external features of a typical air cleaner system or assembly are depicted. Referring to FIG. 1, the reference number 1 depicts the air cleaner. The air cleaner 1 comprises a housing 3 mounted, for example, by a mounting bracket 4 to a frame member 5 of appropriate equipment. The equipment would typically comprise a vehicle such as a truck, off-road construction equipment, tractor or similar vehicle; or, a stationary generator set or air compressor.

The housing 3 of a typical air cleaner 1 is generally defined by two primary sections or segments: i.e. main body 8, and removable service or access cover 9. The access cover 9 provides for service access to an interior of the main body 8, for servicing. For an air cleaner 1 of the general type depicted in FIG. 1, servicing generally involves dismounting and removing from the housing 3 at least one internally received filter element, either for refurbishing or replacement.

The housing 3 of the air cleaner 1 depicted includes outer wall 11, air inlet 12 and outlet 13. For the preferred embodiment shown, the inlet 12 and outlet 13 are both in the main body 8. In typical use, ambient or unfiltered air enters the air cleaner 1 through inlet 12. Within the air cleaner 1, the air is passed through a filter arrangement, described below, to obtain a desirable level of particulate removal. The filtered air then passes outwardly from the air cleaner 1 through outlet 13, and is directed, by appropriate ductwork or conduits, to an inlet of an air intake for an associated engine or compressor or other system.

The particular air cleaner 1 depicted has outer wall 11 defining a barrel shaped or generally cylindrical configuration. In this particular configuration, the outlet 13 can be described as an axial outlet, since it generally extends in the direction of, and circumscribes, axis 15; axis 15 being a longitudinal central axis defined by an internally received primary element 25, as described below.

Figure 2:
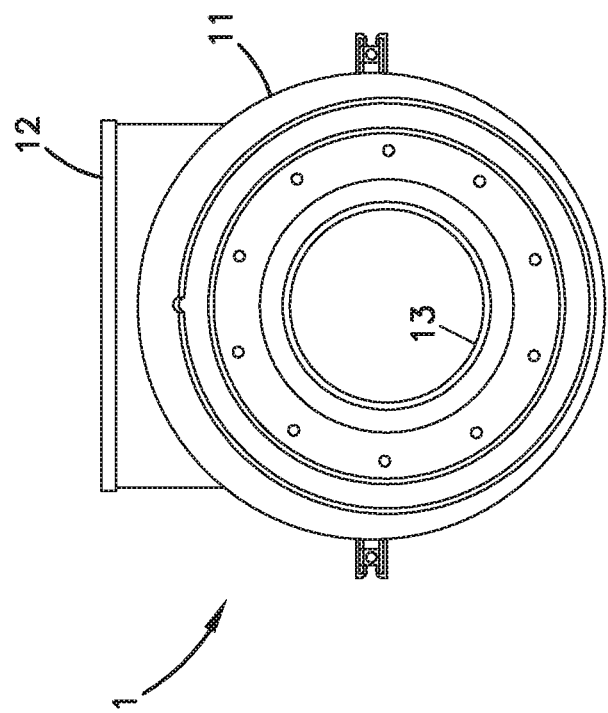
FIG. 2 is an end view of the air cleaner of FIG. 1, but without the air flow tube and mounting bracket.

It is noted that the particular air cleaner 1 depicted in FIG. 1, as seen from the end view of FIG. 2, is somewhat "obround", i.e. slightly off round from cylindrical. Such configurations are well known, as are housings that are more perfectly cylindrical. Herein, both types will be referred to as "generally cylindrical."

Access cover 9 generally fits over an open end 19 of body 8. In the particular arrangement shown, access cover 9 is secured in place over end 19 by latches 20.

Because the particular arrangement 1 depicted is slightly obround, it is desirable to ensure proper alignment between the end cover 9, and a remainder of the housing body 8. Proper radial alignment can be obtained by engagement between a notch 20a (FIGS. 11-13) on the cover 9, and a post on the housing body 8.

The particular air cleaner 1 depicted is shown mounted in a generally horizontal configuration, i.e. with axis 15 extending generally horizontally (assuming the equipment is standing on level ground and with frame section 5 extending generally parallel to the ground). However, it is recognized that air cleaners 1 of the type depicted can be used in other orientations.

Figure 3:
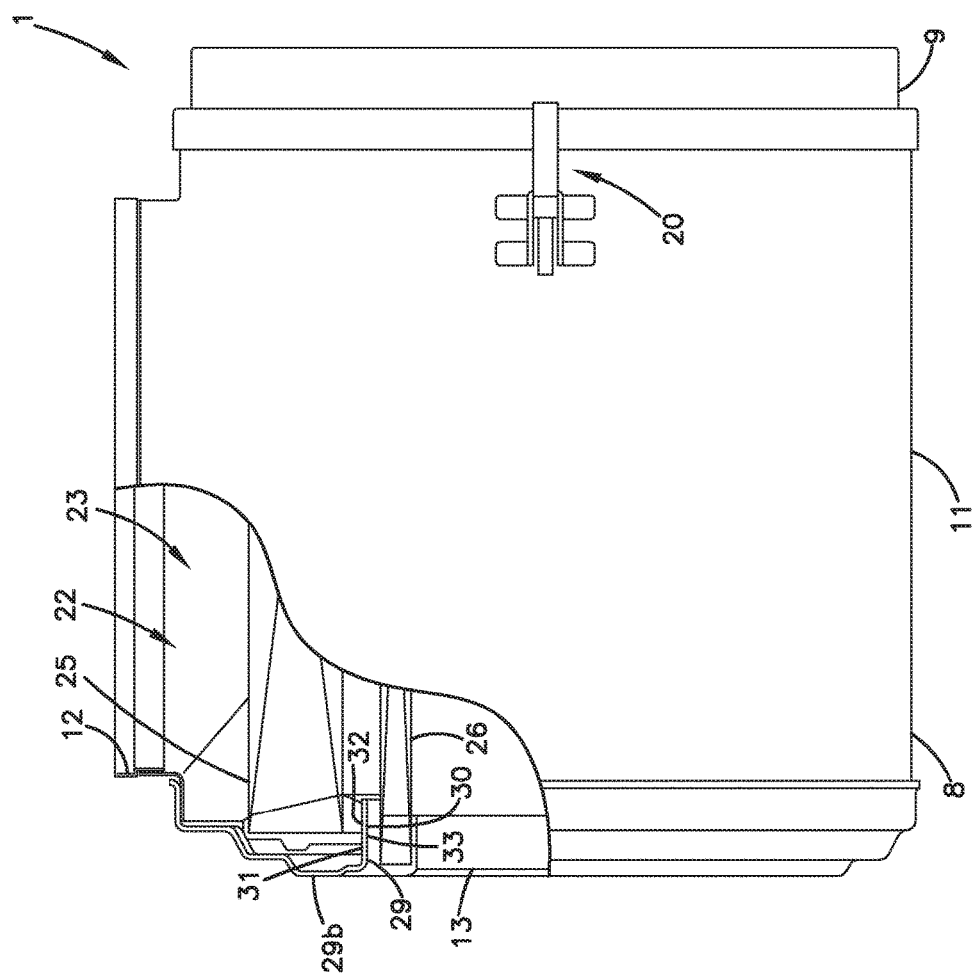
FIG. 3 is a side elevational, fragmented, enlarged view of the air cleaner depicted in FIG. 1.
Figure 4:
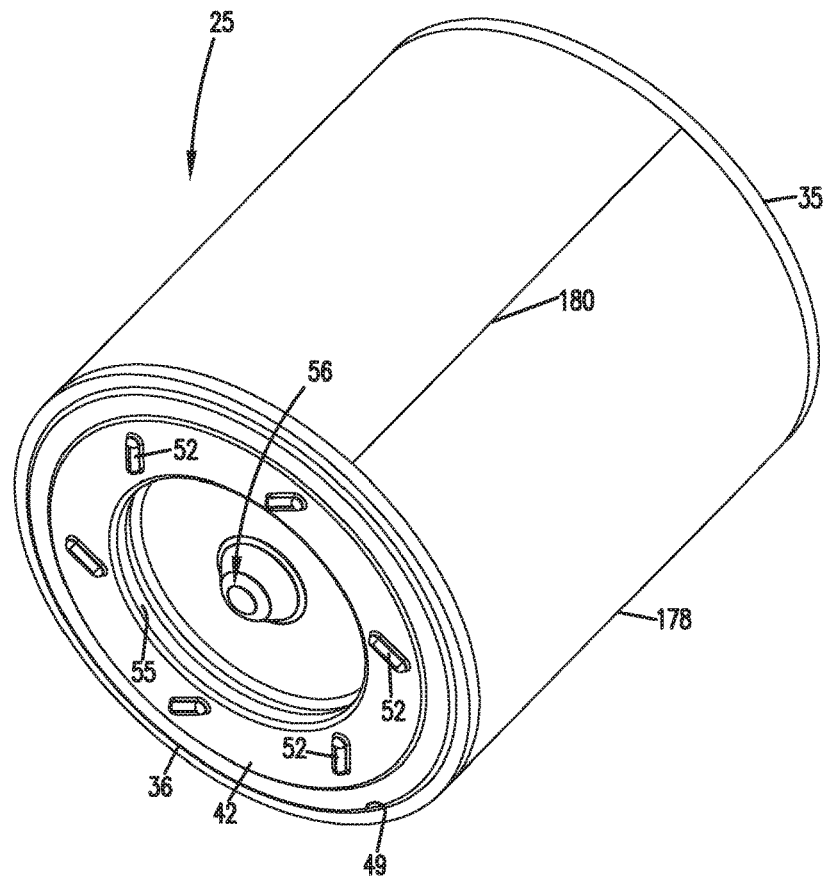
FIG. 4 is a perspective view of a primary filter element usable in the air cleaner depicted in FIGS. 1-3.
Figure 5:
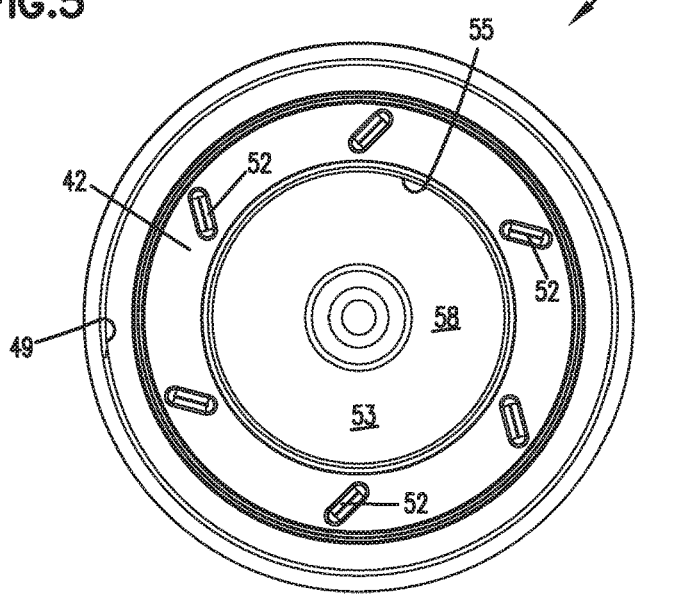
FIG. 5 is an end elevational view of the filter element depicted in FIG. 4.

Attention is directed to FIG. 3, in which portions of the assembly 1 are depicted broken away, for viewing of selected internal detail. Referring to FIG. 3, it can be seen that the body 8, along with side portions 20 of the cover 9, defines interior 22 of the air cleaner assembly 1. Within the interior 22 for the particular air cleaner 1 depicted is positioned an air filter arrangement 23, through which air is directed during use. The particular air filter arrangement 23 shown includes a first or primary filter element 25 and a secondary or safety filter element 26.

For the particular arrangement shown, the filter elements 25 and 26 are cylindrical in configuration, and thus have an outer circular periphery. The housing body, being slightly obround, then, does not define a perfect central longitudinal access in alignment with the filter elements 25, 26. Such arrangements, again, are common. However, it is also common to have both the housing and the filter element have circular outer perimeters, and the same central longitudinal axis.

Herein, the terms "filter element" or "element" are used to refer to a removable, replaceable component (with respect to housing 11) that includes filter media through which the air being filtered passes, as the air is directed: (1) from the inlet 12; (2) through interior 22; (3) to the outlet 13; in general with the element performing an air filtration (or dust removal) function. Unless otherwise stated, the terms "element", "filter" and "filter element" are meant to refer to a removable and replaceable component within the air cleaner assembly 1. Generally, filter elements are configured such that they can be removed and replaced by hand, at appropriate service intervals. This will be described in greater detail below.

Herein, the terms "primary element" and "main element" are generally used to refer to a filter element on which a majority of dust loading occurs during air cleaner use. In typical systems that have two elements, the primary element is positioned upstream from the secondary or safety element, during typical assembly. By "upstream" in this context, it is meant that, due to filter element position, air cleaner configuration, and the location of seals during use, air generally must pass through the primary element before the air passes through the safety or secondary element, when the air moves from the inlet 12 to the outlet 13.

Herein, the terms "secondary element" or "safety element" are used interchangeably, and refer to a downstream element from the primary element. Typically, very little dust loading occurs on the secondary or safety element, and generally only as a result of either: failure of some portion of the primary element or a seal; inadvertent dust movement during servicing of the primary element; or some mishap.

Referring to FIG. 3, for the air cleaner 1 depicted, both the primary element 25 and the safety element 26 are generally cylindrical in configuration, each having an open cylindrical interior and a circular outer periphery (in cross-section). The two elements 25, 26 are configured such that the primary element 25 is mounted in a manner circumscribing the safety element 26. This general configuration of a cylindrical primary element 25 being mounted over a cylindrical secondary element 26 has been used in a variety of equipment, and is described, for example, in the following patents: U.S. Pat. Nos. 6,652,614; 6,051,042; 6,099,606; each of which is incorporated herein by reference.

Referring to FIG. 3, the assembly 1 includes an interior mounting ring or sealing ring 29. The seal ring 29 is a portion of an outlet flow construction or tube 29a (FIG. 1), in flow communication with outlet 13. More specifically, ring 29, wall section 29b and outlet projection 29c collectively form outlet tube 29a for exit of filtered air from the air cleaner 1.

In general, for the arrangement 1 shown, the safety element 26 is mounted to seal against an interior surface 30 of the mounting ring 29 (or tube 29a), and the primary element 25 is mounted to seal against an exterior surface 31 of the mounting ring 29 (or tube 29a).

The seal 32 formed between the primary element 25 and the outer surface 31 of the seal ring 29, will generally be referred to herein as "radial" because the sealing forces are directed radially toward and/or away from, i.e. generally orthogonal to, axis 15. That is, the seal forces are radially directed as opposed to being axially directed; "axial" in this context meaning pointed in a direction generally parallel to axis 15. The particular radial seal for element 25, is sometimes termed "interior" or "internal" because the radial seal 32 is located at an interior of element 25. In addition, a radial seal can generally be considered a type of seal that remains in place when an axial force pushing the filter element into position is removed. That is, a radial seal has a tendency to remain in a sealed relationship with the housing unless disturbed in some way. In contrast, an axial seal typically requires the application of an axial force to maintain the sealing relationship with the housing. Although a radial seal is shown, the primary element 25 can be designed to provide an axial seal.

A variety of types of radial seal systems are known. One of the most widely utilized radial seal systems for air cleaner assemblies of the types depicted in FIGS. 1 and 2, is the Donaldson Radial Seal® system, available from the Donaldson Company, Inc., of Bloomington, Minn., and described generally in such references as EP 0329659; and U.S. Pat. No. 5,547,480; each of these publications being incorporated herein by reference. The Donaldson Radial Seal® systems have been utilized on primary elements for such equipment as off road machinery and vehicles, farm tractors, ore haulers, over-the-highway trucks; and, air compressors.

The safety element 26 is also sealed to the seal ring 29 by a radial seal 33. In this instance, the radial seal 33 is an "exterior" radial seal, since it extends outwardly away from, and around, an outside of element 26, as opposed to being directed inside. Such seals are described for example in U.S. Pat. Nos. 6,652,614 and 6,099,606, which are incorporated herein by reference. Donaldson-manufactured safety elements using such radial seals have been provided for such equipment as off road machinery and equipment such as tracked vehicles; wheeled equipment; roller compactors; generator sets; and, ore haulers. Although the safety element 26 is shown with an exterior radial seal (or an externally directed radial seal), the radial seal can be provided as an internal or internally directed radial seal. Furthermore, the safety filter element can be provided with an axial seal, if desired.

II. Two Potential Issues with Systems Similar to Those Depicted in FIGS. 1 and 2

A. Support for Horizontally Mounted Primary Elements

When the air cleaner system is generally as illustrated in FIGS. 1 and 2, with the axis 15 extending generally horizontally, the filter element 25 is also mounted generally horizontally. At the end 31 associated with the outlet tube 13, the element 25 is generally well supported by the mounting ring 29. However, at the opposite end, not shown in FIG. 2, there is generally no analogous structure to which the element is sealed, to support the element in a horizontal configuration. Thus, typically, a support structure is desirable.

In certain prior radial seal systems, it was known to use an outer cylindrical sleeve or shroud at this location, which supports the primary element exteriorly, in position. Such shrouds are shown for example, in U.S. Pat. Nos. 6,051,042 and 5,755,842, each of which is incorporated herein by reference.

With respect to the issue of horizontal support, radial seal systems differ significantly from axial seal systems. With axial seal systems, generally either a bolt arrangement or clamp arrangement is used to apply axial pressure to the element in some manner forcing the element against an end of the housing. Such systems are shown, for example, in U.S. Pat. No. 3,488,928, which is incorporated herein by reference. In general, horizontal support for such systems is not required during assembly, since the axial pressure keeps the element from moving. In some instances, support arrangements are provided to facilitate appropriate positioning or centering of the element during assembly.

B. Alignment of the Safety Element

In general, servicing of arrangements such as those illustrated in FIGS. 1 and 2 can be a problem, if the safety element 26 is not installed in near perfect axial alignment, since the primary element 25 must be installed over the safety element 26. This problem is exacerbated in longer safety elements 26, i.e. elements at least 10 inches (25 cm) or longer.

To help align the safety element, some safety element alignment systems have been developed, see for example U.S. Pat. Nos. 5,800,581 and 3,488,928, each of the references being incorporated herein by reference.

III. The Primary Element

Attention is now directed to FIGS. 4-7, in which the primary element 25 is depicted. The primary element 25 includes a side extension 34, open end 35, and closed end 36. In general, the side extension 34 extends between the open and closed ends 35, 36. The open end 35 generally defines a central aperture 40, FIG. 7. The primary element 25 described herein is consistent with the primary element described in U.S. Pat. No. 6,652,614, the entire disclosure of which is incorporated herein by reference.

For the embodiment depicted, the primary element 25 includes a first end cap 41 and a second end cap 42, with filter media pack 43 extending therebetween. In general, the first end cap 41 defines a first, or open end 35; the second end cap 42 defines a second, or closed end 36; and, the media pack 43 defines the side extension 34. In typical systems, the media pack 43 will be generally cylindrical with central axis 15. A variety of constructions can be used for the media pack 43, a preferred one for certain applications being described hereinbelow.

For the arrangement 1 depicted, the first end cap 41 serves several functions. For example, it defines central outlet aperture 40 and a central sealing region 46 for sealing against surface 29 (FIG. 3), when the element 25 is installed. Also, the end cap 41 secures components of the media pack 43 together and inhibits air and dust leakage around them.

In addition, structural features provided in the end cap 41 can provide performance enhancements. More specifically, end cap 41 includes a segmented, raised ring structure 44, FIG. 6. When the end cap 41 is manufactured from a preferred soft compressible polyurethane, for example, of the type indicated below, the segmented ring 44 forms a bumper type extension at end 35 of element 25. This can provide a non-sealing, cushioning, against wall 11 of housing 3 (FIG. 1).

In typical preferred systems, the first end cap 41 is a single, unitary, molded material, preferably a soft compressible material; most preferably, a compressible, foamed, polyurethane. Preferred materials and characteristics are provided herein below. Preferably the structural features of the end cap 41, then, are provided during a molding process at the same time that the media pack 43 is potted in, or secured to, the material of end cap 41. A general approach to this construction is also described below.

For certain arrangements, the seal region 46 will be shaped or configured analogously to other Donaldson Radial Seal® systems. Such configurations are described and shown for example in EP 0329659; U.S. Pat. Nos. 5,547,480; 6,099,606; 6,652,614 and WO9942719A2. The complete disclosures of each of these references are incorporated herein by reference.

Figure 8:
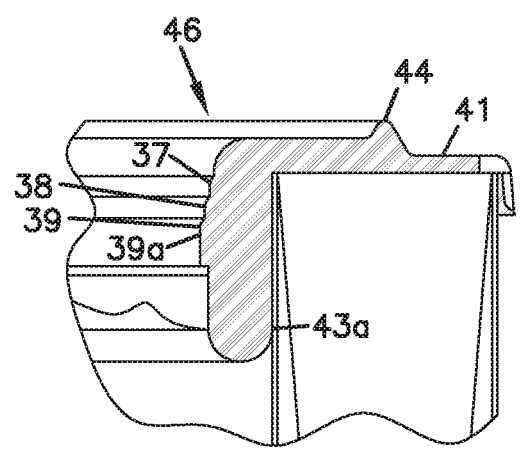
FIG. 8 is an enlarged, cross-sectional view of the seal member of the end cap for the primary filter element, depicted in FIGS. 4-7.

Attention is directed to FIG. 8, which shows a fragmented, blow-up cross-section of a three step or three stage radial seal configuration usable in the element 25.

More specifically, radial seal region 46 includes: (moving from outside of the element inwardly), three ring or steps 37, 38 and 39, of sequentially decreasing diameter. As a result, positioning of the element 25 over the outlet tube 29, is facilitated since the compression occurs in consecutive steps of increasing resistance.

The radial seal region 46 is preferably constructed and arranged to compress at least 12% of its thickness, i.e. the distance between the outer surface 39a when uncompressed, and the inner surface 43a of the media pack, the inner surface 43a typically being defined by an inner liner. Preferably, the compression is by an amount of at least 15% of its thickness, typically 20 to 33% of its thickness.

Again, because of the soft compressible nature of the material of end cap 41, (especially the material in region 46), when the primary element 25 is installed on the seal ring 29, the material in region 46 is compressed against the exterior surface 31; generally with the compression being controlled and contained by a portion of the media pack 43, typically an inner liner as characterized below.

The second end cap 42, defines the closed end 36 of the primary element 25. The second end cap 42 also serves a number of functions. For example, end cap 42 operates to retain the media pack 43 together and sealed at closed end 36. This operation is generally conducted by outer annular region 49 of the second end cap 42. In addition, portions of the second end cap 42 operate to provide extension across otherwise open interior 50 of primary element 25, to close end 51 to passage of unfiltered air therethrough. This function is performed by central area 53 of the second end cap 42. By "closed end", it is meant the end cap 42 prevents passage into or out of the filter interior 50; a closed end includes an end cap with a hole plugged by something carried by the filter element, for example.

As will be indicated below, the annular region 49 may comprise either a soft compressible material or a hard material. Preferably, the annular region 49 includes a plurality of segments 52 projected axially outwardly therefrom, to form a non-sealing, engagement with cover 9, during installation, FIG. 10.

The preferred second end cap 42 depicted includes features providing for additional functions. One function relates to appropriate configuration for support of the primary element 25, when mounted in a horizontal position as indicated in FIGS. 1 and 2. This function is performed in part by central rim 55 as described below. Also preferably, portions of second end cap 42 provide for an alignment and support function in cooperation with the safety element 26. For the particular arrangement shown, this function is provided by safety element engagement portion 56, as described below.

For the particular arrangement depicted, the second end cap 42 is a two component end cap, with the first component comprising molded polymeric material which defines annular region 49 and a second component comprising a preformed structure 58 which defines central rim 55, central region or area 53, and safety element engagement portion 56. By "preformed" in this context, it is meant that the structure 58 preferably comprises a rigid material preformed to possess a preferred configuration and that is then secured into the overall primary element 25, during a step of element construction, described below, prior to molding outer annular region 49. Preformed structure 58 is described in greater detail below.

IV. Support of the Primary Element Second or Closed End, During Air Cleaner Use As indicated above, features of the primary element 25 facilitate support of the element-closed end 36 when installed for use, especially in the horizontal position depicted in FIGS. 1 and 2. With respect to this function, attention is directed to FIGS. 9-15.

Referring first to FIGS. 11-15, end cover 9 is depicted. The end cover 9 includes an outer surface 65 and an inner surface 66. When installed, the outer surface 65 of the cover 9 is the surface generally directed toward the exterior environment, and the inner surface 66 is generally directed toward the air cleaner interior 22.

Figure 13:
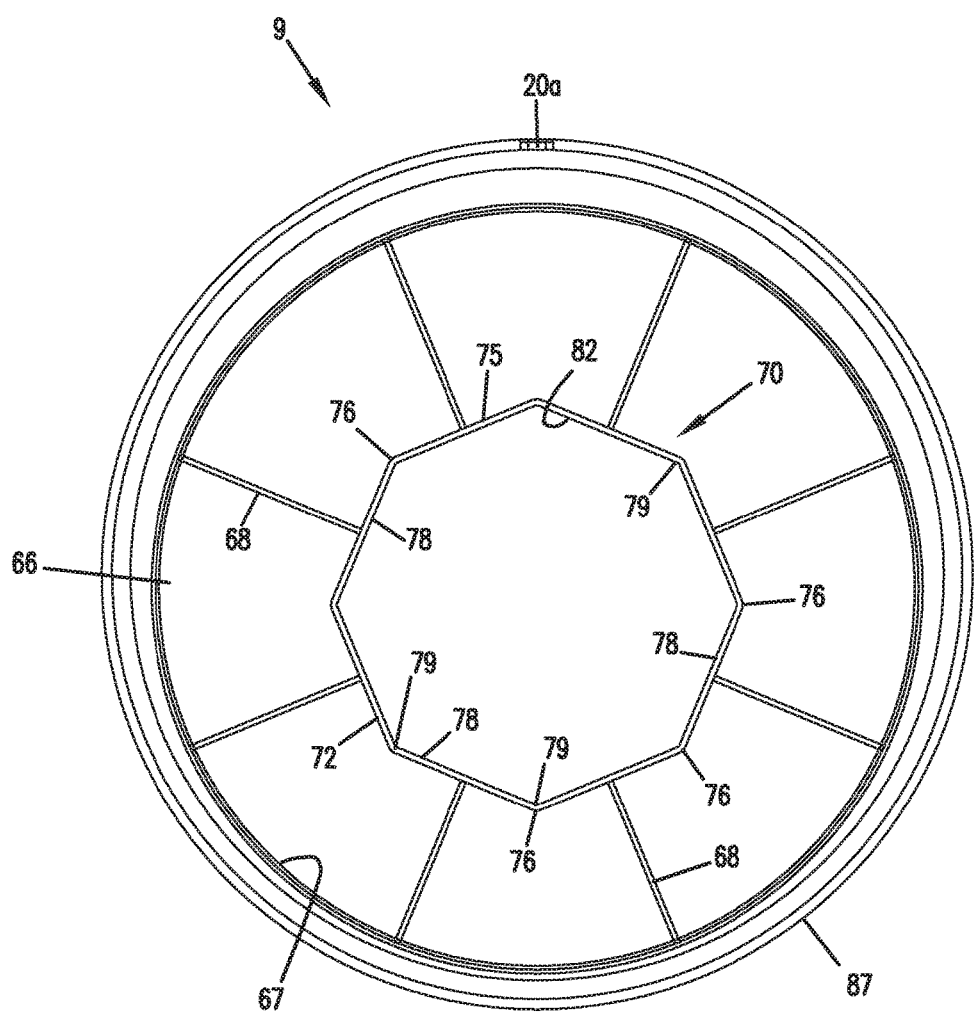
FIG. 13 is a top plan view of the end cover depicted in FIG. 12.
Figure 16:
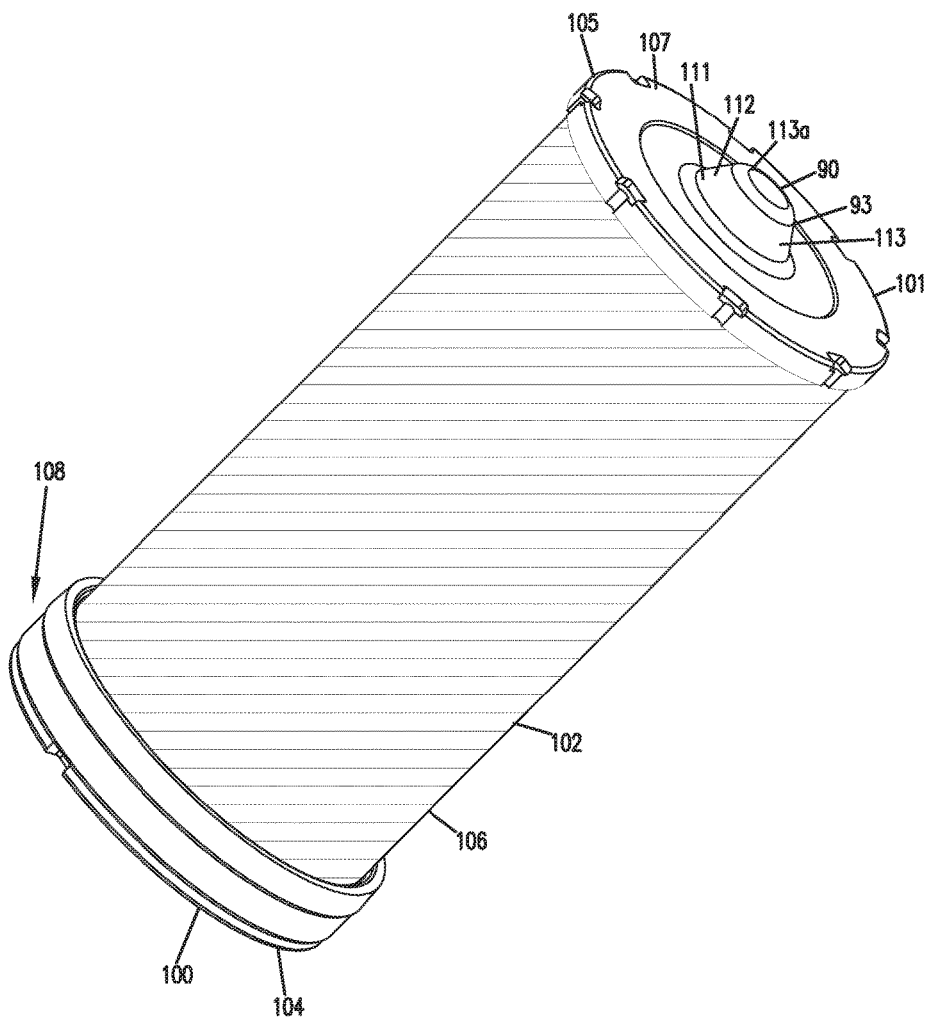
FIG. 16 is a perspective of the safety element.
Figure 17:
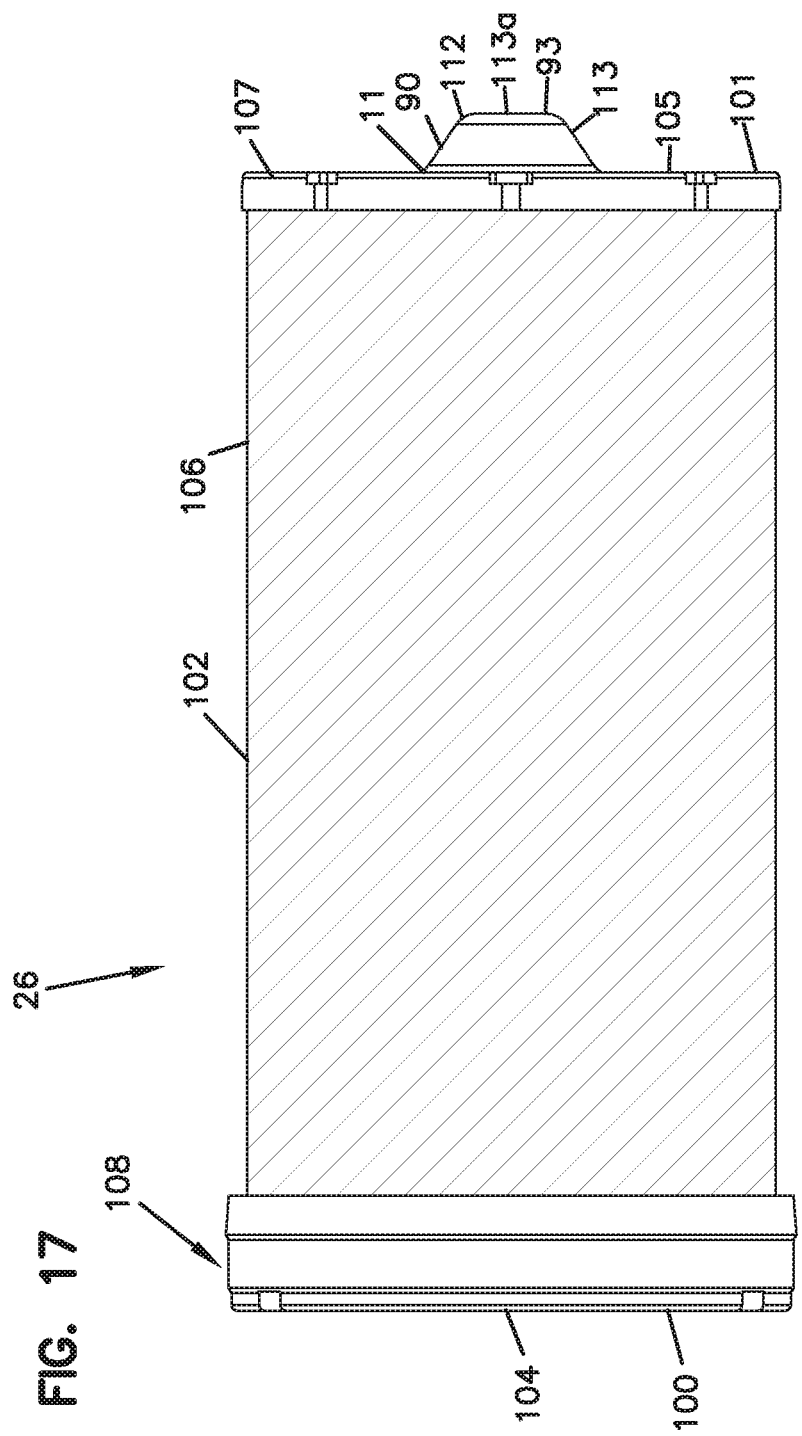
FIG. 17 is a side elevational view of the safety element depicted in FIG. 16.
Figure 18:
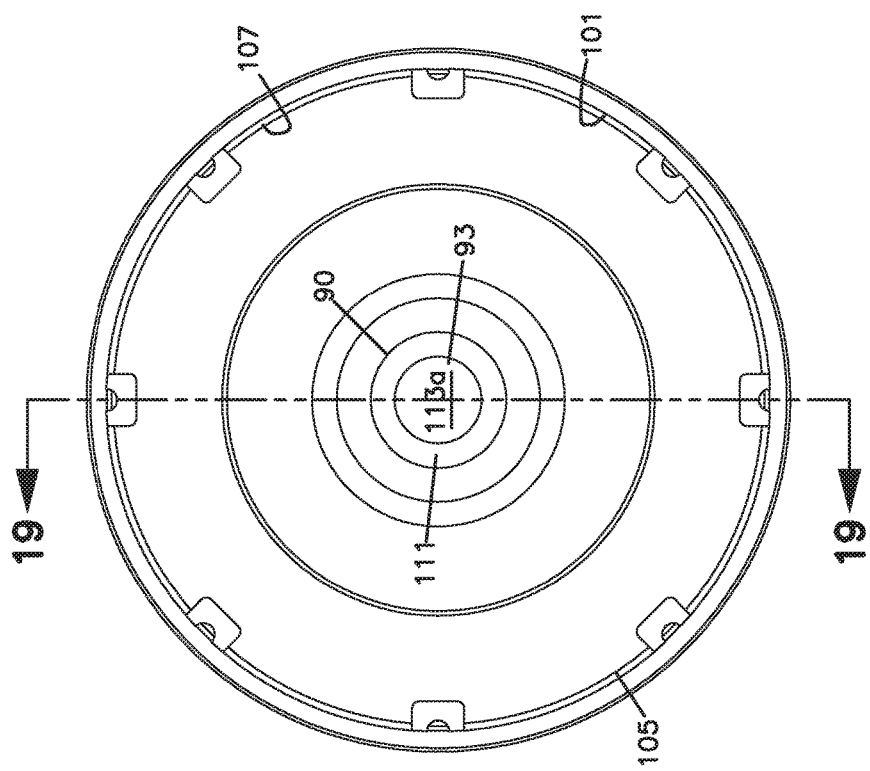
FIG. 18 is an end elevational view of the safety element depicted in FIG. 16.

Referring to FIGS. 12 and 13, the inner surface 66 includes an element engagement construction 70 thereon. The element engagement construction 70 is generally constructed and arranged to interlock or supportingly engage, abut or align with end 36 of element 25, when the cover 9 is positioned on an air cleaner 1 having the preferred primary element 25 installed. For the particular arrangement shown, the element engagement construction 70 comprises a projection 72, which projects into recess 74 of end cap 42, during installation. Preferably the projection 72 is sized and configured to supportingly abut, engage or align with central rim 55 during installation, during assembly. (It is noted that actual contact between projection 72 and rim 55 is not required, if the alignment is adequately close to ensure that the element 25 cannot move or rock downwardly undesirably far, typically, for example, no more than 20 millimeters.) It is noted that if only a few millimeter spacing or less is maintained, shortly after assembly, the main element will tend to settle until engagement actually occurs, typically either as a result of vibrational forces when the equipment is running, or added weight in the element due to particulate load with use.

For the particular preferred system depicted, central rim 55 is circular and thus defines circular recess 74. In preferred systems, the central region 53 is circumscribed by the media pack 43. Preferably, the central rim 55 includes an annular wall 57 with a projection segment 57a. Preferably, the projection segment 57a projects into the central open volume 50 from the second end 36 of the media pack 43 an axial distance of at least 6 mm, typically 12-25 mm, and no greater than 200 mm. The projection segment 57a may be angled or slant toward the interior 50, but by no more than a certain radial distance from the inner edge of the media pack 43 such that it would prevent fitting with the air cleaner end cover 9. Preferably, the projection segment 57a becomes radially spaced no further than 50 mm from the media pack 43 along a distance of inward axial projection of at least 6 mm. In the particular one depicted in the FIGS., segment 57a becomes radially spaced no further than 1-15 mm along a distance of inward axial projection of 12-25 mm. It should be noted that, in alternate embodiments, other portions of the annular wall 57 may be radially spaced from the media pack 43 longer than 50 mm.

Example dimensions include: the rim 55 having a diameter of at least 125 mm, typically 150-180 mm, and no greater than 300 mm. The recess 74 preferably has a depth (or height) (measured from rim 162 to planar region 158) of at least 6 mm, typically 12-25 mm, and no greater than 200 mm.

Preferably, an outer perimeter 75 of projection 72 is non-circular, for reasons that will be described below. Most preferably outer perimeter 75 includes at least three vertices or apices 79. Preferably, outer perimeter 75 defines a polyhedron which is sized and configured to engage, abut or become positionably aligned with circular central rim 55 at spaced points or vertices 76. Regular polyhedral shapes, i.e. polyhedrons having straight segments or sections 78 all of equal length, and defining spaced apices 79, are preferred. Most preferably, the polyhedral perimeter 75 has at least five sides and not more than ten sides, defining at least five and not more than ten apices. The particular projection 72 depicted in FIGS. 12 and 13 is octahedral.

Preferably, projection 72 is configured so that if it does not abut circular central rim 55, the apices 79 are spaced from the central rim 55, when the air cleaner 1 is assembled, by not more than 30 millimeters, and preferably not more than 15 millimeters. This will ensure that, when installed, the element 25 cannot rock downwardly undesirably far.

Preferably, the projection 72 will be continuous in extension, i.e. without gaps, so that it is fairly strong and not likely to break in use. However, discontinuous configurations can be used. Also, preferably, the projection 72 defines a hollow, recessed, interior 82 which, among other things, allows receiving room for certain additional features of the element 25 characterized below. Preferably, perimeter 75 comprises a continuous wall: (a) at least about 0.25 millimeters thick, typically 0.5 to 5 millimeters thick, no more than 20 mm thick; and (b) at least 10 millimeters high, typically 20 to 50 millimeters high, no more than 100 mm high.

Figure 9:
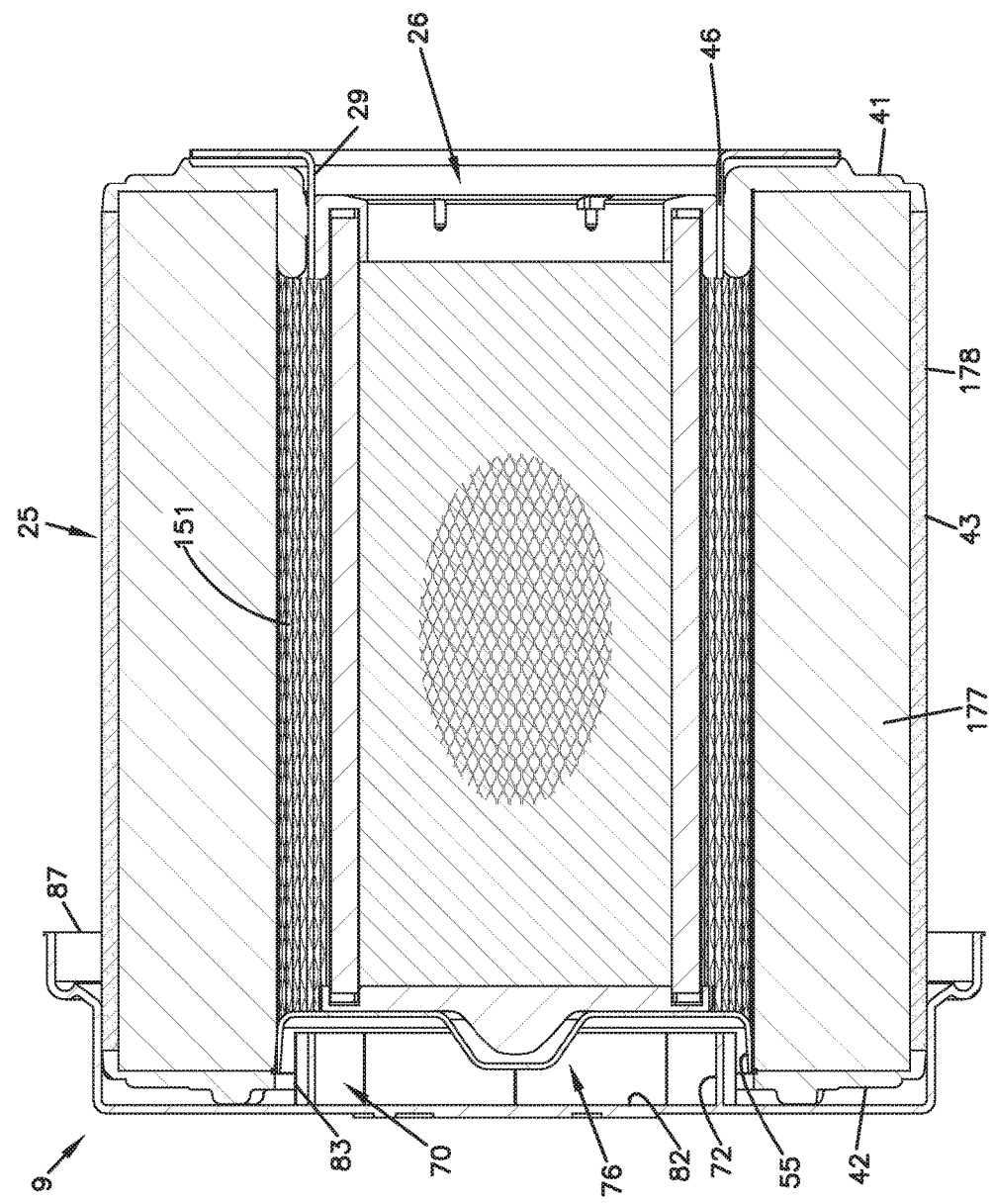
FIG. 9 is a cross-sectional view of the air cleaner showing the primary element and safety element operably mounted in the air cleaner housing.
Figure 10:
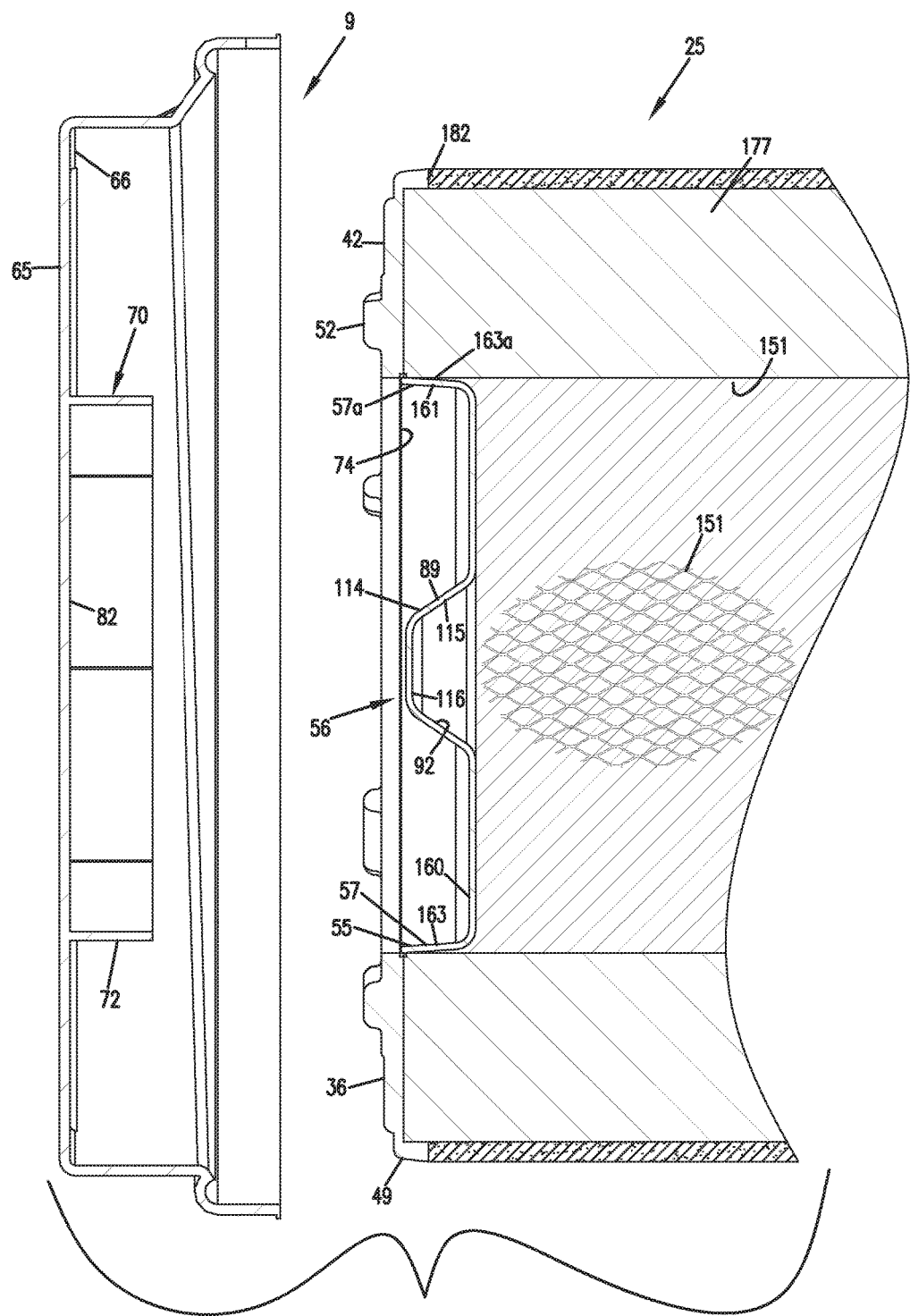
FIG. 10 is a fragmented, cross-sectional view depicting the housing cover being lined up with the end of the primary filter element.

By reference to FIGS. 9 and 10, it will be apparent that after the element is installed, once the cover 9 is put in place, projection 72 will extend into recess 74. In general, any upwardly directed apices, for example apex 83, FIG. 9, will support the element 25 and prevent the element 25 from undesirably sagging, rocking or dropping at end 36. For preferred arrangements, the parts are configured such that projection 72 extends at least 5 millimeters into recess 74, most preferably 10 to 30 millimeters, and not more than 100 mm. FIG. 9 also shows the safety element 26 installed in the system.

From an evaluation of FIGS. 9 and 10, certain advantages to particular configurations of annular region 49, and perimeter 75 will be apparent. Since the preferred annular area 49 is circular, the relative radial (rotational) position of the element 25 on ring 29 when installed, will make no difference, with respect to engagement by the end cover 9. That is, no matter how element 25 is radially oriented, it is generally radially symmetric with respect to axis 15, when installed, at least with respect to the configuration of rim 55.

If the housing were actually cylindrical instead of slightly obround, the preferred shape or configuration characterized with respect to the projection 72 and perimeter 75, would allow for variations in radial orientation of the end cover 9 on end 19. In particular, when the projection 72 contains at least five apices, equally spaced so, if the cover 9 were round, no matter how cover 9 was radially oriented on body 8, in closing the end 19, at least one apex would be directed generally upwardly. However, with the obround configuration, the cover 9 has a fixed configuration relative to the body 8, so the apices are oriented on the cover 9 to ensure that at least one is directed upwardly, when the construction is operably assembled.

It is preferred that the perimeter 75 not be round, for several reasons. First, if the perimeter 75 is not round, persons will be unlikely to try to seal an element to the perimeter 75, which can lead to an inappropriately assembled air cleaner 1. Also, a non-round structure will be relatively strong and self-supporting and will be fairly straight forward to manufacture to appropriate specification.

V. Other Features of End Cover 9

Attention is directed to FIGS. 11 and 14, with respect to end cover 9. External surface 65 generally includes flat central region 84. Surface 65 also includes stepped regions 85, with molded gussets 86 for support As noted, the central region 84 is offset from concentric alignment with outer perimeter rim 87 (FIG. 14). This is so that the end cover 9 can match alignment in certain already existing air cleaner bodies.

As indicated above, certain other existing equipment uses a round housing, in which case the central axis for the projection 72 can be positioned in line with a central axis for the outer perimeter of the cover.

Attention is directed to FIGS. 12 and 13. Inner surface 66, central region 67 includes, projecting inwardly therefrom, wall 75 as well as radially extending strengthening ribs 68. Ribs 68 extend radially from the wall 75 to the outer perimeter rim 87.

VI. Arrangement for Safety Element Alignment

As indicated above, the preferred air cleaner 1 includes an arrangement 76 (FIGS. 20, 21) for ensuring appropriate alignment of the safety element 26 with the primary element 25.

The safety element alignment is one which does not require any structure on the seal ring 29, or indeed any additional structure on the housing 3, but rather operates with features on the elements 25, 26. Thus, it can be retrofit into previously existing housing bodies.

In general, the alignment arrangement 76 includes a projection/receiver arrangement 88 with a first member 89 of the projection/receiver arrangement 88 positioned on the primary element 25, and a second member 90 of the projection/receiver arrangement 88 provided on the safety element 26. For the particular arrangement shown, the primary element 25 includes a receiver member 92 in end cap 42; and the safety element 26 includes a projection member 93, on end cap 105.

Figure 19:
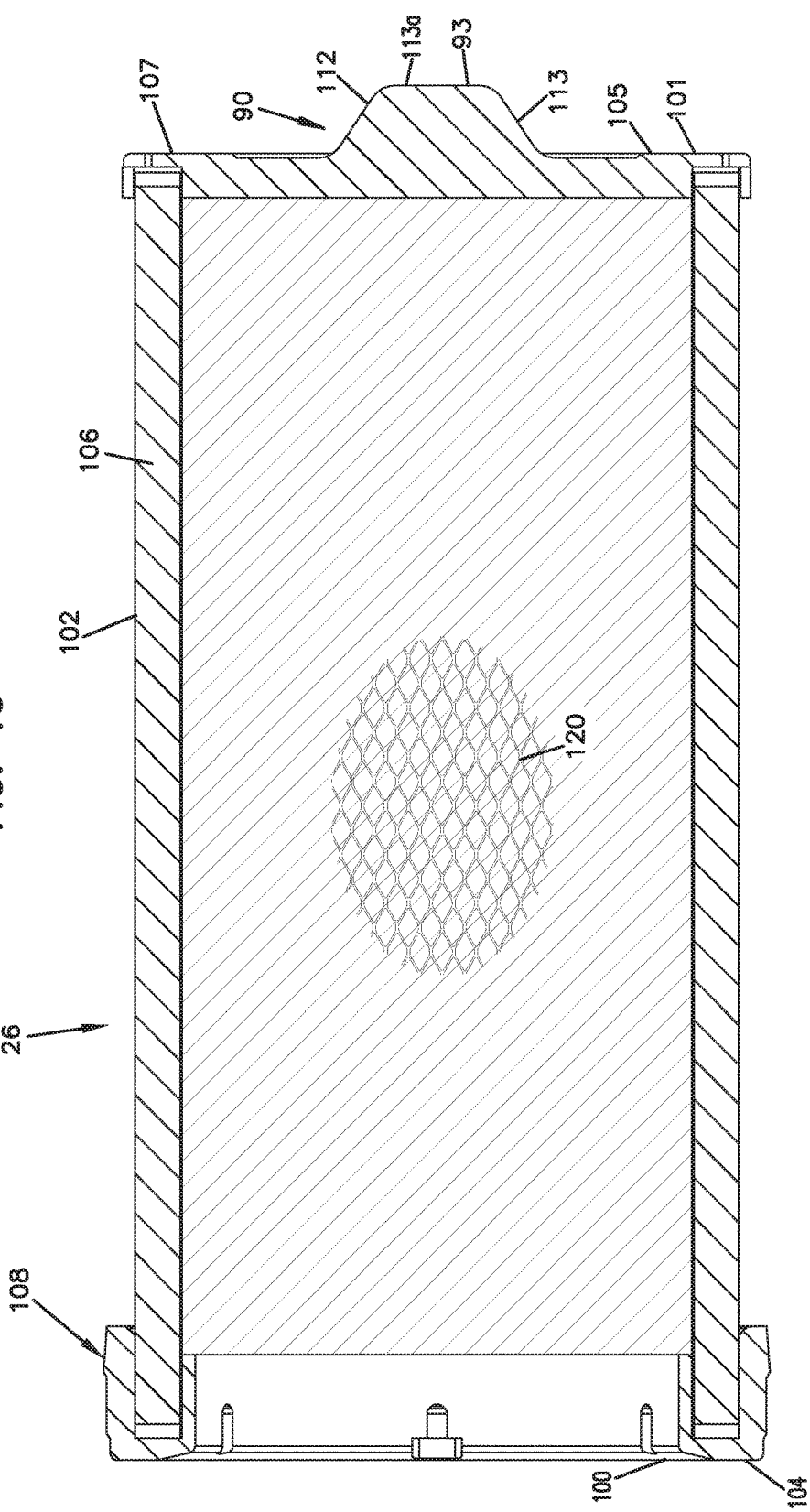
FIG. 19 is a cross-sectional view of the safety element depicted in FIGS. 16-18 and taken along the line 19-19 of FIG. 18.
Figure 20:
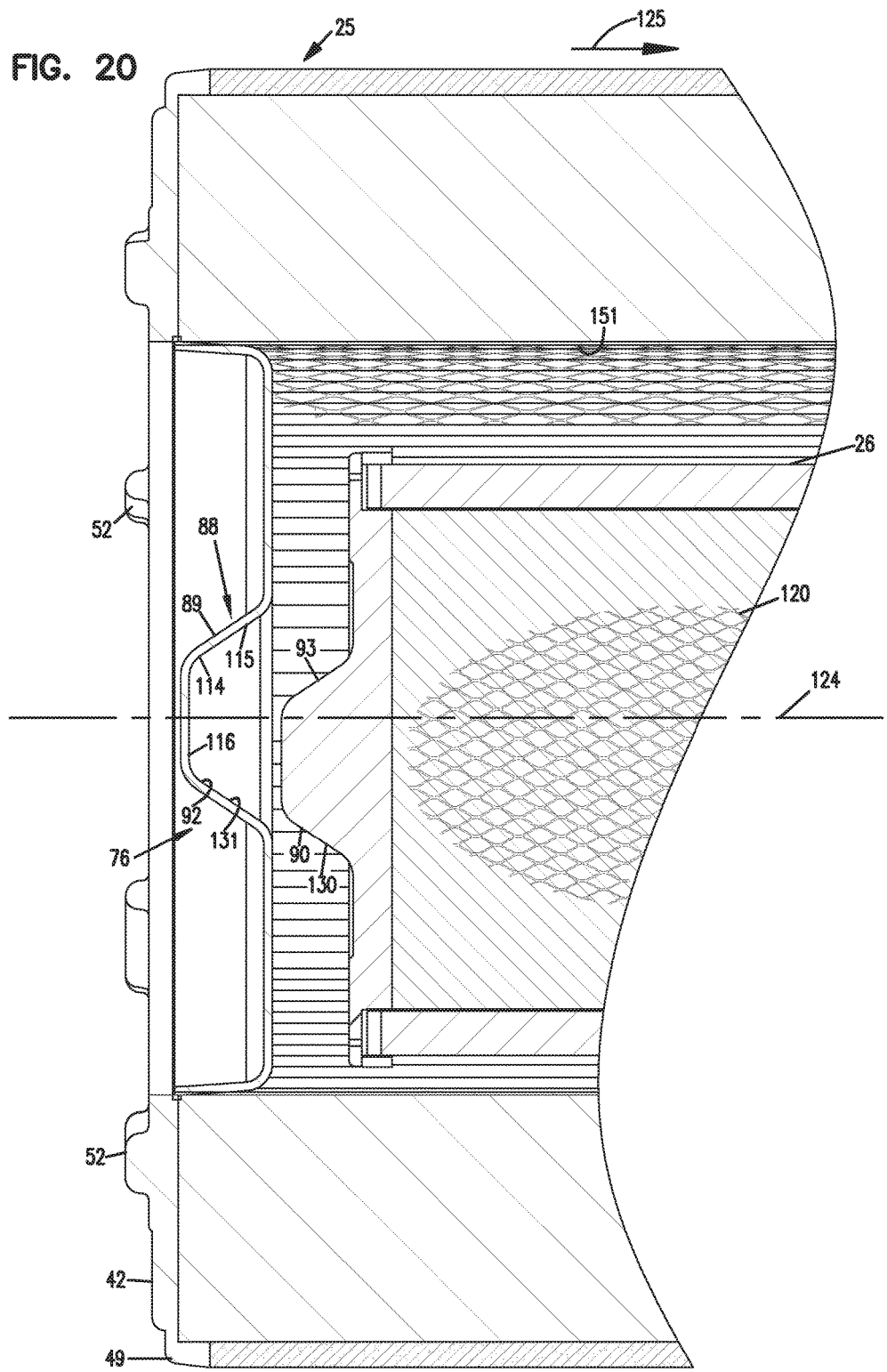
FIG. 20 is a fragmented, cross-sectional view depicting the primary element and safety element being aligned, during mounting of the primary element in the air cleaner.
Figure 21:
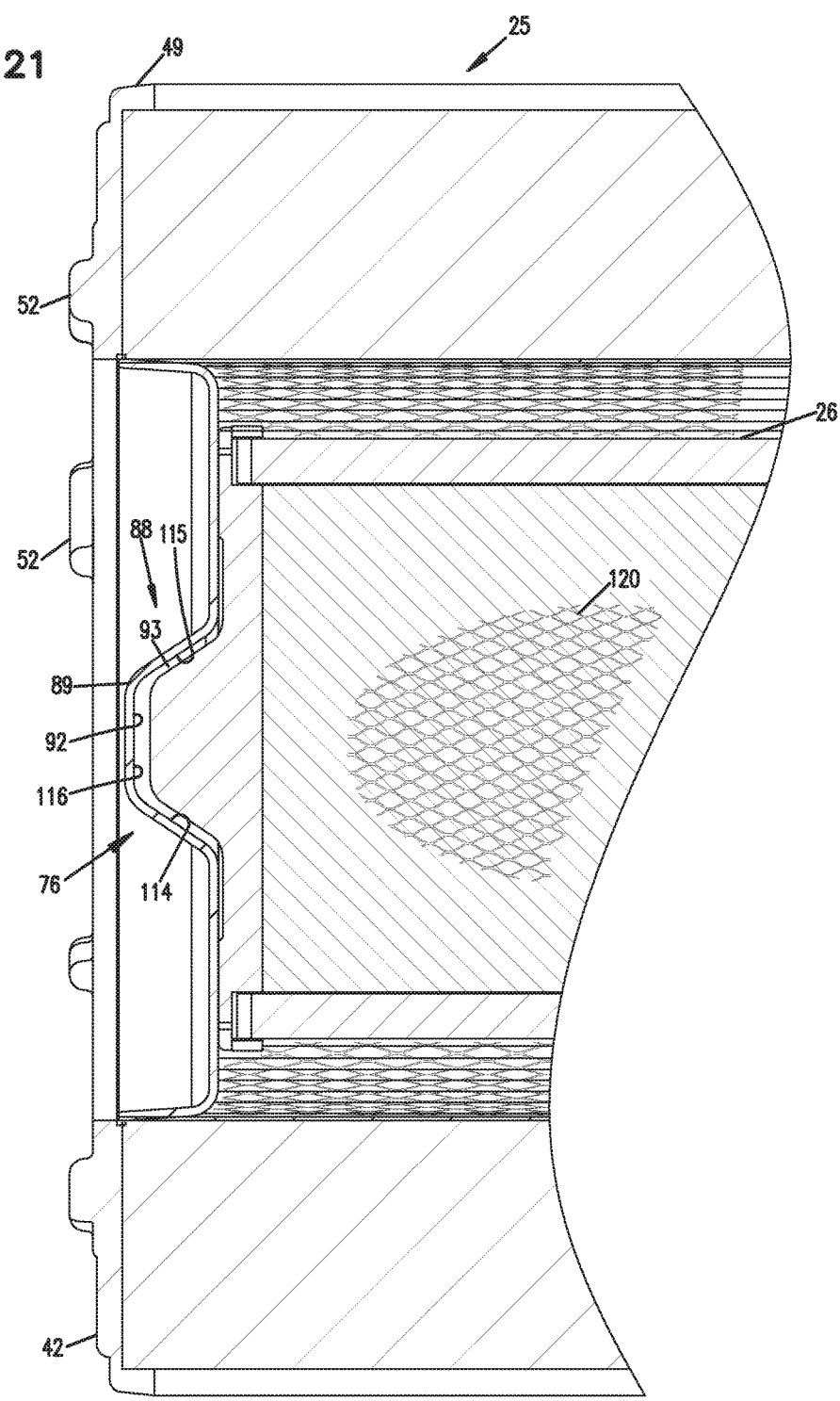
FIG. 21 is a fragmented, cross-sectional view showing the safety element and the primary element in proper alignment with each other.

Attention is directed to FIGS. 16-19, in which the safety element 26 is depicted. The safety element 26 includes a first open end 100, an opposite closed end 101, and a side extension 102. For the particular arrangement shown, the open end 100 is defined by a first open end cap 104; the closed end 101 is defined by a second closed end cap 105; and the side extension 102 is defined by a media pack 106 that is embedded in, and extends between, the two end caps 104, 105. An inner liner 120 is shown extending between the two end caps 104, 105. In alternate arrangements, an outer liner can be added, but it is not necessary. In FIGS. 19-21, only a partial section of the inner liner 120 is depicted.

For the particular embodiment shown, the open end cap 104 provides the functions of: retaining the media pack sealed and assembled, at the open end 100; and, sealing seal region 108 (as an externally directed radial seal) to ring 29, when assembled. For preferred arrangements, end cap 104 is a unitary molded material comprising a soft compressible polymer, preferably foamed polyurethane. Preferred materials and material characteristics are described below. The seal region 108 can be provided as an internally directed radial seal, if desired. Of course, the air cleaner housing can be modified to accept an internally directed radial seal.

The second end cap 105 also performs several functions. For example, it securely encloses end 101, and retains the media pack 106 sealed and assembled at that end. Also, the closed end cap 105 is oriented to extend adjacent to, and in some instances abuts, the primary element 25, so that the safety element 26 does not back away from end 110 (FIG. 1) of air cleaner 1, in use, once the primary element 25 has been installed.

For the preferred embodiment shown, another function provided by the safety element 26 is that it includes a portion of the projection/receiver arrangement 88, which engages a mating member on the primary element 25, to ensure appropriate axial alignment of the safety element 26, during assembly.

More specifically, the safety element 26 includes second member 90 of the projection receiver arrangement 88. For the particular arrangement shown, the second member 90 comprises projection member 93.

Preferred projection members are configured to have an outer perimeter 111 which includes some degree of radial symmetry, so that radial alignment of the safety element 26 is not critical to proper function of the projection/receiver arrangement 88. The particular preferred projection 93 depicted is a frustoconical member 112, having conical sidewall 113 and end 113a.

As described below, the preferred primary element 25 includes an appropriately sized and shaped receiver 92, for the frustoconical member 112.

More specifically, and referring to FIGS. 20-21, the primary element 25 includes a receiver member 92 constructed, arranged and oriented to receive frustoconical member 112 therein, during assembly. A preferred receiver member 92, for a frustoconical projection member 112, is a frustoconical receiver 114, comprising conical sidewall 115 and end 116.

Operation of the projection/receiver system 88, to facilitate alignment between the safety element 26 and the primary element 25 will be understood from the schematic depictions of FIGS. 20 and 21.

Referring to FIG. 20, the safety element is indicated at 26, and the main element at 25. The elements 25, 26 are shown with the safety element 26 out of perfect alignment with central axis 124. As a result of the misalignment, as the primary element 25 is moved in the direction of arrow 125, projection 93 of safety element 26 is engaged by receiver 92, again out of perfect axial alignment. However, a cam or sliding engagement between the surfaces 130 and 131, as primary element 25 continues to be moved in the direction of arrow 125, from the position shown in FIG. 20, will align the elements 25, 26. In particular, engagement between the surfaces 130 and 131 will force the safety element 26 to straighten out or reorient itself, into the alignment shown in FIG. 21. Alternately phrased, preferably the projection/receiver combination 92/93 is oriented such that when misalignment occurs, continued motion along the direction of a central axis for the primary element 25 will tend to cause the safety element 26 to slide into appropriate alignment. It is noted that engagement between the projection 93 and receiver 92, at the end of the alignment, FIG. 21, will also tend to retain the safety element in proper alignment, at least until the primary element 25 is removed.

It is preferred that the projection 93 and the receiver 92 each have sufficient circular symmetry (although not necessarily the same shape) so that relative radial orientation between the safety element and the primary element do not matter, for functioning of the projection/receiver assembly. The frustoconical configuration indicated is preferred but is not required. Alternative usable shapes include: cylinders, cubes, boxes, truncated spheres, hemispheres, and 3-d structures having cross-sections of triangles, pentagons, octagons, or other polyhedrons.

Preferred dimensions for the frustoconical projection 93 are provided herein: a height from end cap outer surface 107 to end 113a of at least 5 millimeters, typically 10-50 millimeters, and not greater than 100 mm; a base diameter, that is, the diameter at its largest section coplanar with end cap surface 107 of at least 25 millimeters, typically 30-80 millimeters, and not greater than 150 mm; and a diameter at its end 113a of at least 5 millimeters, typically 10-30 millimeters, not greater than 80 mm. The sidewall 113 extends at an angle between the base diameter and the end 113a at least 0.5°, typically 1-45°, and not greater than 80°. The receiver 92 is preferably sized to receive the projection 93 without interference. As such, the receiver 92 may be sized on the order of 5-20% larger than the above dimensions (i.e.: a height (or depth, depending on perspective) of 11-40 mm; a diameter at its largest section (open end) of 33-100 mm; and a diameter at its closed end of 11-40 mm).

VII. Methods of Forming the Primary Filter Element

In FIG. 7, media pack 43 is depicted. Media pack 43 includes an inner liner 151 and a cylindrical extension of filter media 152 that circumscribes the inner liner 151. For a preferred system, the inner liner 151 and extension media 152 are the same length. In FIG. 7, the inner liner 151 is shown fragmented. It should be understood that if an inner liner is used, the liner will line the entire inner portion of the filter media 152.

During typical assembly, the cylindrical extension of filter media 152 will be constructed and then be slid over inner liner 151. A later step of manufacture is an engagement between the media pack 43 and central end cap member 160. In a final molded construction, central end cap member 160 will serve to form and define the following features: central area 53 of the closed end cap 42; central rim 55; and, receiver 92.

Preferably, the central end cap member 160 has a bowl shape 161, with an outwardly projecting rim 162, central receiver 92, and planar region 158. In the particular embodiment depicted, planar region 158 corresponds to an outer surface portion of the end cap 42 that is most recessed relative to remaining portions of the end cap 42. Preferably, the recessed sidewall 163 of the bowl 161 has an outer circular periphery 163a (FIG. 10) with an outside diameter slightly larger than an inside diameter of inner liner 151, so as to cause an interference fit when the inner liner 151 is pressed over sidewall 163.

The assembly comprising central end cap member 160 and media pack 43 is then positioned in a mold, into which is also positioned a resin for forming a remainder of the closed end cap 42.

The opposite open end cap 41 can be formed either before or after the closed end cap 42. In general, the open end cap 41 would be formed by placing an appropriate end of the media pack 43 into a mold, with resin to form the end cap. Preferred central end cap member 160 will comprise molded, rigid plastic, constructions.

VIII. Preferred Methods of Forming the Safety Filter Element

Typical methods of preparation of the safety filter element 26 involve combining the media pack 106 and the inner liner 120; placing a first end in a mold, with resin, to mold the closed end cap; and placing a second end in a mold, with resin, to form the open end cap. The media pack 106 and the inner line 120 can be bonded together or not bonded together. When they are bonded together, they can be bonded using adhesive or they can be bonded as a result of fusing fibers of the media pack 106 to the inner line 120. Preferably the closed end 101 of the safety element 26 is formed from a molded plastic, such as urethane having a hardness of 30 Shore D.

As to the open end cap having the external directed radial seal thereon, resin capable of forming upon cure, and appropriately soft, compressible polyurethane end cap of the same type as would be used to form the first end cap having the radial seal thereon for the primary element, would generally be preferred.

IX. Preferred Media Packs

One particular useful construction is depicted in FIG. 7. In this construction, the primary element has first open end cap 41, comprising soft compressible foam polyurethane in accord with the specifications given below; second end cap 42 manufactured in accord with the method indicated above and comprising a composite of: a central bowl 161 molded from rigid plastic; and an outer annular region molded from urethane. The media pack comprises inner liner 151 which is porous; immediately surrounded by a pleated media region 177 having a pleat depth of at least 25 mm, typically 50-100 mm. Preferably the pleated media 177 comprises paper or cellulose. One type of pleated cellulose usable in constructions described herein has the following properties: a basis weight of 63-71 lbs./3000 ft$^2$; a thickness of about 0.013 inch; a pore size of about 88 microns; a corrugation of 0.015-0.021 inch; a dry tensile strength of 12-28 lbs./in.; a wet tensile strength of 3-13 lbs./in.; a wet burst strength of 15-35 psi; a Frazier permeability of 50-64 ft$^3$/min. Preferably, the inner liner comprises expanded metal, but may also be non-metallic such as plastic.

Positioned outside of the pleated media is a cylindrical extension of fibrous depth media 178, preferably an air laid polyester fiber media having thickness within the construction of 0.25-1 inch. In particular media having the following properties is usable: a weight of 4.6-5.6 oz./yd$^2$; and a permeability of 900 ft$^3$/min.

In the particular arrangement shown, the extension of depth media comprises a single wrap of material such as fibrous depth media, stitched to form seam 180. Alternative methods of securing the commercially available depth media 178 in a cylindrical configuration can be used.

It is noted that a variety of alternate constructions of depth media can be provided, for example, multilayered systems, gradient systems, etc. However, the particular construction shown, with specifications as indicated below, leaves a substantial improvement when installed in a previously existing air cleaner. In some arrangements, it may be desirable to secure or support the pleated media 177 with a narrow band around the circumference of the pleat tips. If a band is used, the band will be applied before the outer wrap 178 is placed over the pleated media 177.

Attention is again directed to FIG. 7. FIG. 7 shows the entire media pack 43 as embedded or molded in each of the end caps 41, 42. It can be seen that the sleeve of depth media 178 is tucked into the end cap 41 at tuck 181. Similarly, the opposite end of the sleeve of fibrous depth media 178 is tucked into end cap 42 at tuck 182. In the arrangement shown in FIG. 7, it is contemplated that the entire media pack 43 including both the pleated media 177 and the depth media 178 is embedded in each of the end caps 41, 42 as a total unit, which results in the tucked regions 181, 182. In alternative methods of constructions, only the pleated media 177 will be molded within and embedded in the opposite end caps 41, 42. In this alternative arrangement, the depth media 178 is then wrapped around the resulting construction of the pleated media 177 embedded in the opposite end caps 41, 42.

Preferably, the end cap 41 and the end cap 104, which form the sealing regions 46, 108 respectively, are constructed of molded foamed polyurethane. One example material has the following properties: a tensile strength of 110 psi minimum; an elongation of 200% minimum; a tear strength of 15 lbs./in. minimum; a compression deflection at 70° F. of an average of 7-14 psi; a compression deflection after heat aging 7 days at 158° F. of +/−20% change from original deflection values; a compression deflection at cold temperature of −40° F. of 100 psi maximum; a compression set after heat aging 22 hours at 158° F. of 10% maximum; and after heat aging 22 hours at 180° of 25% maximum.

The filtration media for use in the safety element can be referred to as waved media. The filtration media includes at least one layer with a waved configuration providing increased surface area, and another layer that helps hold the layer with a waved configuration in place. The "increased surface area" is in comparison to non-waved media. The filtration media can be referred to as a multilayer laminate media construction, and can be provided having desired performance without the need to place oil on the media. In general, many prior art media constructions are oiled to increase performance. That is, oil is sprayed onto the media in order to assist the media with retaining small particulates while, at the same time, permitting sufficient air flow through the media. One drawback with oiling media is that the oil has a tendency to spread to other components of the air cleaner system and to components downstream of the air cleaner system. The multilayer laminate media construction useful in forming the safety filter can be provided as non-oiled while providing desired performance. Furthermore, the use of the multilayer laminate media construction for the safety filter allows for the safety filter to be provided without an outer support or outer liner. The safety filter can include an inner liner or support to define a central open volume, but the outer liner or support common in prior art safeties can be avoided. In the case of pleated media, it is generally desirable to hold the pleated media between an inner liner and an outer liner so that the pleated media retains its shape. In the case of the multilayer laminate media construction, an outer liner is unnecessary in order for the media to retain its shape. Furthermore, by avoiding the presence of an outer liner, enhanced permeability can be achieved. In general, a liner has a tendency to mask filtration media.

An exemplary multilayer laminate media construction that can be used in the safety element includes the media disclosed, for example, in U.S. Pat. No. 8,257,459, the disclosure which is incorporated herein by reference. Exemplary multilayer laminate media constructions that can be used in the safety element are commercially available under the name NanoWave® WA61125M2 and WA60825M2 from Hollingsworth & Vose Company, Ltd. in Floyd, Va. In general, the multilayer laminate media construction that can be used in a safety element such as the type of element described should have a Frazier air permeability and a DOP filtration efficiency so that the safety filter element performs, as desired, in the type of environment described. By way of example, the multilayer laminate media construction can have a Frazier air permeability in a range of about 75 ft/min to about 200 ft/min when measured clean and non-oiled at 0.5 inch water column restriction according to ASTM D737. Preferably, the multilayer laminate media construction can have a Frazier air permeability in a range of about 85 ft/min to about 160 ft/min when measured clean and non-oiled at 0.5 inch water column restriction according to ASTM D737. Furthermore, the multilayer laminate media construction can have a DOP filtration efficiency of about 10 to about 50, and can have a DOP filtration efficiency of about 15 to about 40.

The multilayer laminate media construction includes at least one filtration (e.g., fibrous, membrane) layer that is held in a waved or curvilinear configuration by one or more additional layers (e.g., fibrous). As a result of the waved configuration, the filter media has an increased surface area compared to non-waved filtration media, and the increased surface area contributes to improved filtration properties.

Figure 22:
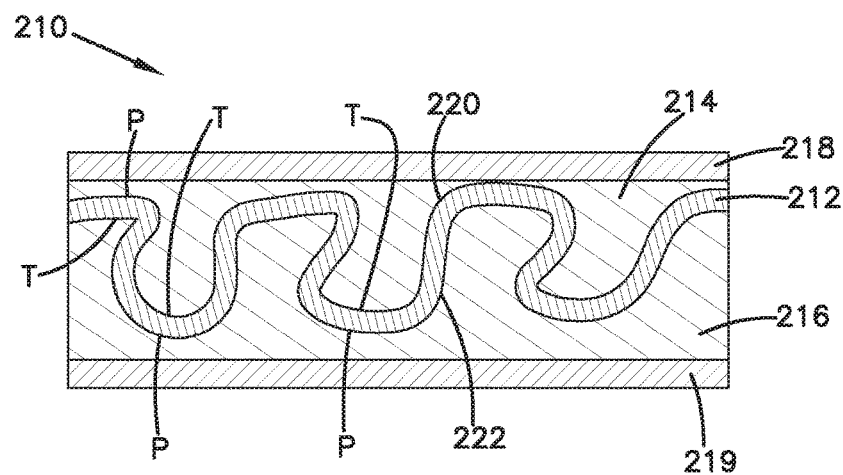
FIG. 22 is an illustration of a sectional view of the multilayer laminate media construction.

Now referring to FIG. 22, a schematic representation of an exemplary multilayer laminate media construction is shown at reference number 210. The multilayer laminate media construction 210 can be referred to as the filtration media or as the filter media for convenience. The multilayer laminate media construction 210 includes a filtration layer 212 and a first fibrous support layer 214. The filtration layer 212 includes a first side 220 and a second side 222, and the first fibrous support layer 214 is provided adjacent the first side 220. The multilayer laminate media construction 210 can include a second fibrous support layer 216 provided adjacent the second side 222 of the filtration layer 212. The filtration media 210 can be provided with one of the first fibrous support layer 214 or the second fibrous support layer 216, or both of the first fibrous support layer 214 and the second fibrous support layer 216. The first fibrous support layer 214, the second fibrous support layer 216, or both the first fibrous support layer 214 and the second fibrous support layer 216 help hold the filtration layer 212 in a waved configuration to maintain separation of peaks P and troughs of adjacent waves of the filtration layer. Any layer of the multilayer laminate media construction 210 can be charged or uncharged. Although the first fibrous support layer is shown adjacent the first side 220, and the second fibrous support layer is shown adjacent the second side 222, it should be understood that other layers can be provided between the filtration layer and the fibrous support layers. In addition, the filtration layer 212 can be provided having two or more layers.

In the illustrated multilayer laminate media construction 210, the first fibrous support layer 214 is provided upstream of the filtration layer 212, and the second fibrous support layer 216 is provided downstream of the filtration layer. The first and second fibrous support layers 214 and 216, either alone or in combination, can help maintain the waved configuration of the filtration layer 212. While two fibrous support layers 214 and 216 are shown, the filtration media 210 need not include both support layers 214 and 216.

Where only one support layer is provided, the support layer can be disposed upstream or downstream of the filtration layer.

The multilayer laminate media construction 210 can also optionally include one or more outer or cover layers located on the upstream-most and/or downstream-most sides of the filter media 210. The multilayer laminate media construction 210 can include a cover layer 218 and/or a cover layer 219. The cover layer 218 can be provided upstream of the filtration layer 212, and the cover layer 219 can be provided downstream of the filtration layer 212. The cover layers 218 and 219 can be provided to help hold the filtration layer 212 in a waved configuration. In addition, the cover layers 218 and 219 can help with dust loading, can help provide a more pleasing look to the filter media 210, and can help protect the filtration layer 212.

In an exemplary embodiment, the filter media 210 includes at least one fine fiber filtration layer 212. In an exemplary embodiment, a single filtration layer 212 formed from fine fibers is used, however the filter media 210 can include any number of additional filtration layers disposed between the downstream support layer and the upstream support layer, adjacent to the filtration layer 212, or disposed elsewhere within the filter media 210. Additional filtration layers can be maintained in a waved configuration with the filtration layer 212. In certain exemplary embodiment, the filter media 210 can include one or more additional filtration layers disposed upstream of the filtration layer 212. The additional filtration layer(s) can be formed from fine fibers, or more preferably can be formed from fibers having an average fiber diameter that is greater than an average fiber diameter of the fibers that form the filtration layer 212.

The filtration layer 212 can be formed from a variety of fibers, but in an exemplary embodiment the filtration layer 212 is formed from fibers having an average fiber diameter that is less than about 10 µm and more preferably that is less than about 5 µm, and more preferably that is less than about 3 µm. In certain exemplary embodiments, the fibers can have an average fiber diameter of about 1.5 µm or less, including nanofibers having an average diameter of less than about 1 µm, e.g., about 0.5 µm. In some embodiments, the fibers have an average fiber diameter of between about 0.3 µm and about 1.5 µm, or between about 0.3 µm and about 1.0 µm.

Various materials can also be used to form the fibers, including synthetic and non-synthetic materials. In one exemplary embodiment, the filtration layer 212, and any additional filtration layer(s), is formed from meltblown fibers. Exemplary materials include, by way of non-limiting example, polyolefins, such as polypropylene and polyethylene; polyesters, such as polybutylene terephthalate and polyethylene terephthalate; polyamides, such as Nylon; polycarbonate; polyphenylene sulfide; polystyrene; and polyurethane. In another embodiment, the fine fiber filtration layer 212 can be formed from glass fibers. Various manufacturing techniques can be used to form the glass fiber web, include wetlaid or drylaid webs. The type and size of glass fiber can also vary, but in an exemplary embodiment, the fiber is a microglass fiber, such as A-type or E-type glass fibers made using a rotary or flame attenuation process and having an average fiber diameter in the range of about 0.2 µm to 5 µm. However, other suitable materials include, by way of non-limiting example, polyvinyl alcohol and polyvinylidene fluoride. The fine fiber filtration layer 212, and any additional filtration layer(s), can also be formed using various other techniques known in the art, including wet laid techniques, air laid techniques, carding, electrospinning, and spunbonding. In embodiments in which the fine fiber filtration layer is charged, the layer may be charged prior to joining with another layer, or after a composite of two or more layers has been formed.

The resulting filtration layer 212, as well as any additional filtration layer(s), can also have a variety of thicknesses, air permeabilities, basis weights, and filtration efficiencies depending upon the requirements of a desired application. In one exemplary embodiment, the fine fiber filtration layer 212, as measured in a planar configuration, has a thickness in the range of about 0.1 mils to 30 mils; for example, between about 0.1 mils to 2 mils, or between about 2 mils to 12 mils.

In some embodiments, the filter media 210 may include at least one membrane layer that is formed in a waved configuration. In these embodiments, the membrane layer(s) may function as the filtration layer. Similarly to that described above for the fine fiber filtration layer, the membrane layer may be incorporated into the filter media between support layers. It should be understood that though the description herein generally focuses on filter media that include a fine fiber filtration layer, the description also applies to filter media that include a membrane filtration layer. For example, in the embodiment shown in FIG. 22, the filtration layer 212 may be a membrane filtration layer rather than a fine fiber filtration layer as described above. The fine fiber filtration later can be provided as a non-woven layer. In addition, the fine fiber filtration layer can be provided having multiple layers. For example, one layer can be a non-woven and another layer can be a non-woven layer or a membrane. The fine fiber filtration can have any number of separate layers.

In some embodiments, filter media that include a filtration membrane layer in a waved configuration may not include any fine fiber filtration layers in a waved configuration. In some embodiments, one or more membrane layers may be incorporated in a filter media in a waved configuration along with one or more fine fiber layers. For example, a membrane layer may be layered on or together with a fine fiber layer. It should be understood that the filter media may include any number of additional filtration layers (which may be either membrane or fine fiber) disposed between the downstream support layer and the upstream support layer.

In general, any suitable material may be used to form the membrane layer. Suitable materials include polytetrafluoroethylene (PTFE) (e.g., expanded or unexpanded), polyethylene (e.g., linear low density, ultra high molecular weight), polypropylene, polycarbonate, polyester, nitrocellulose-mixed esters, polyethersulfone, cellulose acetate, polyimide, cellulose acetate, polyvinylidene fluoride, polyacrylonitrile, polysulfone, polyethersulfone, and polyamide, amongst others. In some embodiments, PTFE membranes may be preferred.

The membrane layer may be a single layer film or a multilayer film. In embodiments which use multilayer films, the different layers may have different compositions. In general, the membrane layer may be formed by suitable methods that are known in the art. The membrane layer has a plurality of pores. The pores permit the fluid to pass through while contamination particles are captured on the membrane.

As also indicated above, the filter media 210 can include at least one fibrous support layer. In an exemplary embodiment, the filter media 210 includes a upstream support layer 214 disposed on the first side 220 of the filtration layer 212 and that is effective to hold the filtration layer 212 in the waved configuration. The filter media 210 can also include an downstream support layer 216 that is disposed on the second side 222 of the fine fiber filtration layer 212 opposite to the upstream support layer 214. The downstream support layer 216 can likewise help maintain the filtration layer 212 in a waved configuration. The filter media 210 can include any number of layers, and it need not include two support layers. In certain exemplary embodiments, the filter media 210 can be formed from a filtration layer 212 and a single, adjacent support layer 214 or 216. In other embodiments, the filter media can include any number of additional layers arranged in various configurations. The particular number and type of layers will depend on the intended use of the filter media.

The support layers 214, 216 can be formed from a variety of fibers types and sizes. In an exemplary embodiment, the upstream support layer 214 and the downstream support layer 216 can be formed from fibers having an average fiber diameter that is greater than an average fiber diameter of the fine fiber filtration layer 212. In addition, the upstream support layer 214 and the downstream support layer 216 can be provided from fibers having different average fiber diameter. For example, the upstream support layer 216 can be formed from fibers having an average fiber diameter that is less than an average fiber diameter of the downstream support layer 214, or vice versa. The cover layers 218 and 219 can be provided having a larger average fiber diameter than the average fiber diameter of the fine fiber filtration layer 212. By way of example, the upstream support layer 214 can be formed from fibers having an average fiber diameter in the range of about 5 µm to 40 µm, and more preferably that is in the range of about 20 µm to 30 µm or about 10 µm to 20 µm, and the downstream support layer 216 can be formed from fibers having an average fiber diameter that is in the range of about 10 µm to 40 µm, and more preferably that is in the range of about 15 µm to 20 µm or about 10 µm to 20 µm. In another example, the values in the previous sentence are reversed for the layers 214 and 216.

Various materials can also be used to form the fibers of the support layers 214, 216, including synthetic and non-synthetic materials. In one exemplary embodiment, the support layers 214, 216 are formed from staple fibers, and in particular from a combination of binder fibers and non-binder fibers. One suitable fiber composition is a blend of at least about 20% binder fiber and a balance of non-binder fiber. A variety of types of binder and non-binder fibers can be used to form the media of the present invention. The binder fibers can be formed from any material that is effective to facilitate thermal bonding between the layers, and will thus have an activation temperature that is lower than the melting temperature of the non-binder fibers. The binder fibers can be monocomponent fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This is particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, a polyamide core/polyethylene sheath, and combinations thereof. Other exemplary bicomponent binder fibers can include split fiber fibers, side-by-side fibers, and/or "island in the sea" fibers. Exemplary bicomponent binder fibers can include Trevira Types 254, 255, and 256; Invista Cellbond®. Type 255; Fiber Innovations Types 201, 202, 215, and 252; and ES Fibervisions AL-Adhesion-C ESC 806A.

The non-binder fibers can be synthetic and/or non-synthetic, and in an exemplary embodiment the non-binder fibers can be about 100 percent synthetic. In general, synthetic fibers are preferred over non-synthetic fibers for resistance to moisture, heat, long-term aging, and microbiological degradation. Exemplary synthetic non-binder fibers can include polyesters, acrylics, polyolefins, nylons, rayons, and combinations thereof. Alternatively, the non-binder fibers used to form the media can include non-synthetic fibers such as glass fibers, glass wool fibers, cellulose pulp fibers, such as wood pulp fibers, and combinations thereof. Exemplary synthetic non-binder fibers can include Trevira Type 290 and Wellman Fortrel®. Types 204, 289 and 510.

The support layers 214, 216 can also be formed using various techniques known in the art, including meltblowing, wet laid techniques, air laid techniques, carding, electrospinning, and spunbonding. In an exemplary embodiment, however, the support layers 214, 216 are carded or airlaid webs. The resulting layers 214, 216 can also have a variety of thicknesses, air permeabilities, and basis weights depending upon the requirements of a desired application. In one exemplary embodiment, the downstream support layer 214 and the upstream support layer 216, as measured in a planar configuration, each have a thickness in the range of about 10 mil to 60 mil, an air permeability in the range of about 300 CFM to 1000 CFM, and a basis weight in the range of about 10 gsm to 100 gsm.

As previously indicated, the filter media 210 can also optionally include one or more cover layers. The cover layers 218 and 219 can be planar layers that are mated to the filter media 210 after the fine fiber filtration layer 212 and the support layers 214, 216 are waved. The cover layer 218 and 219 thus provides a surface that is aesthetically pleasing. The cover layers 218 and 219 can be formed from a variety of fiber types and sizes, but in an exemplary embodiment the top layer 218 is formed from fibers having an average fiber diameter that is less than an average fiber diameter of the upstream support layer 216 disposed immediately downstream of the cover layer 218, but that is greater than an average fiber diameter of the fine fiber filtration layer 212. In certain exemplary embodiments, the cover layer 218 is formed from fibers having an average fiber diameter in the range of about 5 µm to 20 µm. As a result, the cover layer 218 can function as a dust holding layer without affecting the alpha value of the filter media 210, as will be discussed in more detail below. The cover layers 218 and 219 can be advantageous in situation where the side where the cover layer is located may be subject to abrasion.

Various materials can also be used to form the fibers of the cover layer, including synthetic and non-synthetic materials. In one exemplary embodiment, the outer or cover layer, e.g., top layer 218 and/or bottom layer 219, is formed from staple fibers, and in particular from a combination of binder fibers and non-binder fibers. One suitable fiber composition is a blend of at least about 20% binder fiber and a balance of non-binder fiber. A variety of types of binder and non-binder fibers can be used to form the media of the present invention, including those previously discussed above with respect to the support layers 214, 216.

The cover layers can also be formed using various techniques known in the art, including meltblowing, wet laid techniques, air laid techniques, carding, electrospinning, and spunbonding. For example, the cover layer 218 can be an airlaid layer and the cover layer 219 can be is a spunbond layer. The resulting layer can also have a variety of thicknesses, air permeabilities, and basis weights depending upon the requirements of a desired application. In one exemplary embodiment, the cover layer, as measured in a planar configuration, has a thickness in the range of about 2 mil to 50 mil, an air permeability in the range of about 100 CFM to 1200 CFM, and a basis weight in the range of about 10 gsm to 50 gsm.

A person skilled in the art will appreciate that various layers can be added to enhance filtration, to provide support, to alter structure, or for various other purposes. By way of non-limiting example, the filter media can include various spunbond wetlaid cellulose, drylaid synthetic nonwoven, wetlaid synthetic, and wetlaid microglass layers.

Method of Manufacturing

Some or all of the layers can be formed into a waved configuration using various manufacturing techniques. In one exemplary embodiment, the filtration layer 212 (e.g., fine fiber or membrane), any additional filtration layers, and preferably at least one of the support layers 214, 216, are positioned adjacent to one another in a desired arrangement and the combined layers are conveyed between first and second moving surfaces that are traveling at different speeds, such as with the second surface traveling at a speed that is slower than the speed of the first surface. A suction force, such as a vacuum force, can be used to pull the layers toward the first moving surface, and then toward the second moving surface as the layers travel from the first to the second moving surfaces. The speed difference causes the layers to form z-direction waves as they pass onto the second moving surface, thus forming peaks and troughs in the layers. The speed of each surface can be altered to obtain the desired number of waves per inch. The distance between the surfaces can also be altered to determine the amplitude of the peaks and troughs, and in an exemplary embodiment the distance is adjusted between 0.025" to 4". For example, the amplitude of the peaks and waves may be between about 0.1" to 4.0", e.g., between about 0.1" to 1.0", between about 0.1" to 2.0", or between about 3.0" to 4.0". For certain applications, the amplitude of the peaks and waves may be between about 0.1" and 1.0", between about 0.1" and 0.5", or between about 0.1" and 0.3". The properties of the different layers can also be altered to obtain a desired filter media configuration. In an exemplary embodiment the filter media has about 2 to 6 waves per inch, with a height (overall thickness) in the range of about 0.025" to 2", however this can vary significantly depending on the intended application. For instance, in other embodiments, the filter media may have about 2 to 4 waves per inch, e.g., about 3 waves per inch. The overall thickness of the media may be between about 0.025" to 4.0", e.g., between about 0.1" to 1.0", between about 0.1" to 2.0" or between about 3.0" to 4.0". For certain applications, the overall thickness of the media may be between about 0.1" and 0.5", or between about 0.1" and 0.3". A single wave extends from the middle of one peak to the middle of an adjacent peak.

The support layers 214, 216 will extend across the peaks P and into the troughs T so that the support layers 214, 216 also have waved configurations. A person skilled in the art will appreciate that a peak P on one side of the fine fiber filtration layer 212 will have a corresponding trough T on the other side. Thus, the upstream support layer 214 will extend into a trough T, and exactly opposite that same trough T is a peak P, across which the downstream support layer 216 will extend. Since the upstream support layer 214 extends into the troughs T on the upstream side of the fine fiber filtration layer 212, the upstream layer 214 will maintain adjacent peaks P on the upstream side at a distance apart from one another and will maintain adjacent troughs T on the upstream side at a distance apart from one another. The downstream support layer 216, if provided, can likewise maintain adjacent peaks P on the downstream side of the fine fiber filtration layer 212 at a distance apart from one another and can maintain adjacent troughs T on the downstream side of the fine fiber filtration layer 212 at a distance apart from one another. As a result, the fine fiber filtration layer 212 has a surface area that is significantly increased, as compared to a surface area of the fine fiber filtration layer in the planar configuration. In certain exemplary embodiments, the surface area in the waved configuration is increased by at least about 50%, and in some instances as much as 120%, as compared to the surface area of the same layer in a planar configuration. The increased surface area leads to an increased filtration efficiency.

In embodiments in which the upstream and/or downstream support layers hold the fine fiber filtration layer in a waved configuration, it may be desirable to reduce the amount of free volume (e.g., volume that is unoccupied by any fibers) in the troughs. That is, a relatively high percentage of the volume in the troughs may be occupied by the support layer(s) to give the fine fiber layer structural support. For example, at least 95% or substantially all of the available volume in the troughs may be filled with the support layer and the course support layer may have a solidity ranging between about 1% to 90%, between about 1% to 50%, between about 10% to 50%, or between about 20% to 50%.

In certain exemplary embodiments, the downstream and/or upstream support layers 214, 16 can have a fiber density that is greater at the peaks than it is in the troughs, and a fiber mass that is less at the peaks than it is in the troughs. This can result from the coarseness of the upstream and/or downstream support layers 214, 216 relative to the fine fiber filtration layer 212. In particular, as the layers are passed from the first moving surface to the second moving surface, the relatively fine nature of the fine fiber filtration layer 212 will allow the downstream and/or upstream support layers 214, 216 to conform around the waves formed in the fine fiber filtration layer 212. As the support layers 214, 216 extend across a peak P, the distance traveled will be less than the distance that each layer 214, 216 travels to fill a trough. As a result, the support layers 214, 216 will compact at the peaks, thus having an increased fiber density at the peaks as compared to the troughs, through which the layers will travel to form a loop-shaped configuration.

Once the layers are formed into a waved configuration, the waved shape can be maintained by activating the binder fibers to effect bonding of the fibers. A variety of techniques can be used to activate the binder fibers. For example, if bicomponent binder fibers having a core and sheath are used, the binder fibers can be activated upon the application of heat. If monocomponent binder fibers are used, the binder fibers can be activated upon the application of heat, steam and/or some other form of warm moisture.

A cover layer 218 and/or cover layer 219 can also be positioned over the upstream support layer 214 or over the downstream support layer 216, respectively, and mated, such as by bonding. The cover layer 218 and the cover layer 219 can be provided as scrim layers and can be referred to more simply as scrims. In general, the cover layers or scrim layers are provided to protect the underlying layers including the filtration layer 212. A person skilled in the art will also appreciate that the layers can optionally be mated to one another using various techniques other than using binder fibers. Other suitable mating techniques include adhesives, needling, hydroentanglement, and chemical binders. The layers can also be individually bonded layers, and/or they can be mated, including bonded, to one another prior to being waved.

A saturant can also optionally be applied to the material prior to drying the material. A variety of saturants can be used with the media of the present invention to facilitate the forming of the layers at a temperature that is less than the melting temperature of the fibers. Exemplary saturants can include phenolic resins, melamine resins, urea resins, epoxy resins, polyacrylate esters, polystyrene/acrylates, polyvinyl chlorides, polyethylene/vinyl chlorides, polyvinyl acetates, polyvinyl alcohols, and combinations and copolymers thereof that are present in an aqueous or organic solvent.

In other embodiments, the resulting media can also have a gradient in at least one, and optionally all, of the following properties: binder and non-binder fibers composition, fiber diameter, solidity, basis weight, and saturant content. For example, in one embodiment, the media can have a lightweight, lofty, coarse-fibred, lightly bonded and lightly saturated sheet upstream, and a heavier, denser, fine-fibred, heavily bonded and heavily saturated sheet downstream. This allows the coarser particles to be trapped in the upstream layer, preventing early saturation of the bottom layer. In other embodiments, the upstream-most layer can be lighter and/or loftier than the downstream-most layer. That is, the upstream layer can have a solidity (e.g., the solid volume fraction of fibers in the web) and a basis weight that is less than that of the downstream layer. Additionally, in embodiments where the filter media includes a saturant, the media can have a gradient with respect to the amount of saturant in the upstream-most and downstream-most layers. One skilled in the art will appreciate the variety of properties that the layers of the media can have.

An electrostatic charge can also optionally be imparted to the filter media, or to various layers of the media, to form an electret fiber web. For example, a charge may be imparted to a fine fiber filtration layer prior to joining with one or more support layers. In another embodiment, a charge is imparted to a filter media including more than one layer, e.g., a fine fiber filtration layer and one or more support layers. Depending on the materials used to form each of the layers, the amount of charge, and the method of charging, the charge may either remain in one or more of the layers or dissipate after a short period of time (e.g., within hours). A variety of techniques are well known to impart a permanent dipole to the polymer web in order to form electret filter media. Charging can be effected through the use of AC and/or DC corona discharge units and combinations thereof. The particular characteristics of the discharge are determined by the shape of the electrodes, the polarity, the size of the gap, and the gas or gas mixture. Charging can also be accomplished using other techniques, including friction-based charging techniques.

Figure 23:
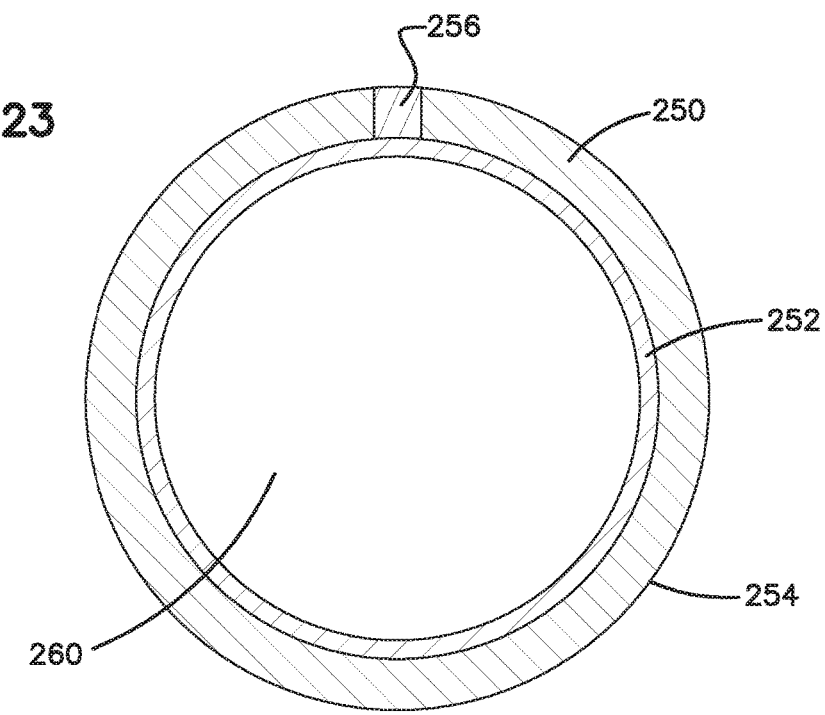
FIG. 23 is an illustration of a sectional view of the safety element.

The multilayer laminate media construction is preferably selected so that it has a Frazier air permeability in a range of about 75 ft$^3$/min to about 200 ft$^3$/min when measured at 0.5 inch water column restriction according to ASTM D737 and when the multilayer laminate media construction is both clean (non-soiled) and non-oiled. The Frazier air permeability range of about 75 ft/min to about 200 ft/min is desirable because that is a performance range desired for a safety filter element in an air cleaner of a the type shown in the figures. In addition, the Frazier air permeability can be in a range of about 85 ft/min to about 160 ft/min when clean and non-oiled and measured at 0.5 inch water column restriction according to ASTM D737. Furthermore, the multilayer laminate media construction can be formed in a cylindrical configuration as a result of a mating the filtration media along a seam. Referring to FIG. 23, an exemplary multilayer laminate media construction is shown at reference number 250. The multilayer laminate media construction 250 is provided in a cylindrical configuration around an inner liner 252. Within the inner liner 252 is an area that can be referred to as the safety central open volume 260. Prior to placing the multilayer laminate media construction 250 around the inner liner 252, the multilayer laminate media construction is formed in a cylindrical shape 254. The cylindrical shape can be created by forming a seam 256 extending the length of the multilayer laminate media construction 250 from a first end to a second end. A technique for forming the seam 256 includes overlapping the filtration media and subjecting the overlap to heat and pressure so that the fibers in the filter media fuse together sufficiently to provide seal integrity. By way of example, the material at the seam 256 can be placed between a substrate and a platen, and heated for a time sufficient to create a seal with sufficient integrity. For example, platen can be applied at a pressure of about 70 psi, a heater strip at the seam can be energized for three seconds and the pressure can continue to be applied for an additional four seconds. The presence of a sufficient seal can be observed by a change in appearance of the material wherein the seam 256 is generally transparent. It is understood that the material at the seam undergoes a melting to create a sufficient seal in the filter media.

For the arrangement shown in FIG. 23, the multilayer laminate media construction 250 can be provided having a single cover layer 218 or 219. In the case of the media having a single cover layer 218 or 219, the cover layer can be provided so that it faces the inner liner 252. If there is no cover 218 or 219 and the media construction only includes one of the first fibrous support layer 214 or the second fibrous support layer 216, the fibrous support layer can be provided facing the inner liner 252. Because the safety filter element is provided within the central, open, volume of the primary filter element, the media construction 250 is protected from damage by, for example, abrasion. Furthermore, while the safety filter element can be described as having a cylindrical shape, it should be understood that the safety element can be provided having a conical shape. The safety filter element can taper, for example, from the first end cap (having a central aperture) to the second end cap (the closed end cap). In general, the configuration shown in FIG. 23 can be referred to as a closed loop configuration (or more simply as a closed loop) and includes media configurations that are referred to as cylindrical configurations and conical configurations.

X. Examples

One example primary element has the following dimensions: an overall length of at least 225 mm, typically 300-385 mm; an inner diameter at its open end cap of at least 125 mm, typically 150-255 mm; an inside diameter of the bowl 161 of at least 125 mm, typically 150-180 mm; a height of the receiver member 92 of at least 6 mm, typically 12-25 mm; an outermost diameter of the receiver 92 of at least 25 mm, typically 37-75 mm; an overall outer diameter of at least 200 mm, typically 280-385 mm.

One example safety element 26 has the following dimensions: an overall length of at least 125 mm, typically 255-400 mm; an outermost diameter of at least 50 mm, typically 125-200 mm; an inside diameter of at least 30 mm, typically 75-125 mm; and a height of projection member 93 of at least 6 mm, typically 12-20 mm.

One example end cover 9 has the following dimensions: an outermost diameter of at least 150 mm, typically 300-400 millimeters; a depth of at least 20 mm, typically 40-100 millimeters; a polyhedral wall forming the outer perimeter 75 having a height of 20-60%, typically 30-50% of the overall height of the end cover, at least 5 mm, typically 10-40 millimeters.

XI. Alternative Multilayer Laminate Media

Figure 24:
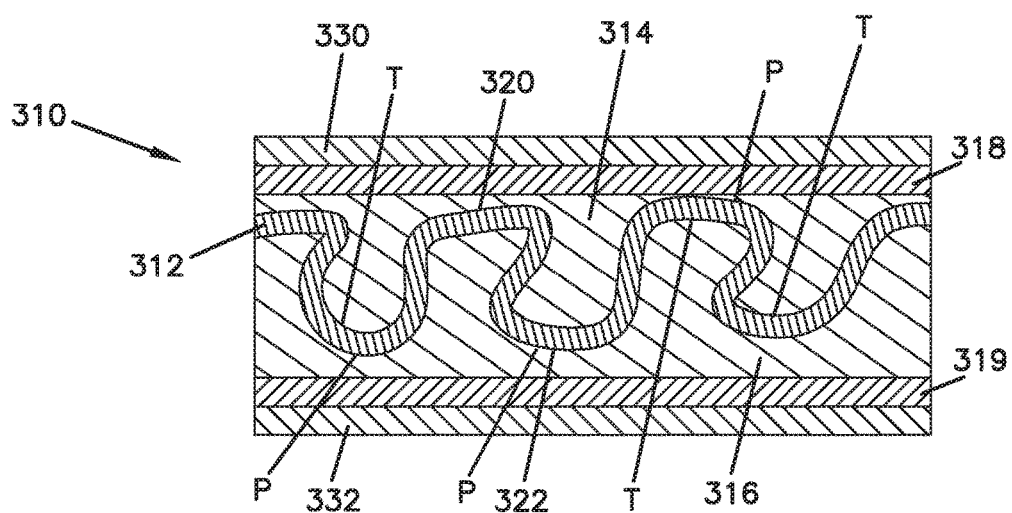
FIG. 24 is an illustration of a sectional view of an alternative multilayer laminate media construction.

Now referring to FIG. 24, an alternative multilayer laminate media is shown at reference number 310. The multilayer laminate media 310 may be similar to the multilayer laminate media 210 in FIG. 22 except that it contains at least a first outer fibrous layer 330, and may contain a second outer fibrous layer 332. In addition, the multilayer laminate media 310 can be used in the applications for the multilayer laminate media 210 described previously, and the multilayer laminate media 210 can be used in the applications described in the context of the multilayer laminate media 310. The various applications include media packs, filter elements, air cleaners, and described methods of making and using.

The multilayer laminate media construction 310 includes a filtration layer 312 and a first fibrous support layer 314. The filtration layer 312 includes a first side 320 and a second side 322, and the first fibrous support layer 314 is provided adjacent the first side 320. The multilayer laminate media construction 310 can include a second fibrous support layer 316 provided adjacent the second side 322 of the filtration layer 312. The filtration media 210 can be provided with one of the first fibrous support layer 314 or the second fibrous support layer 316, or both of the first fibrous support layer 314 and the second fibrous support layer 316. The first fibrous support layer 314, the second fibrous support layer 316, or both the first fibrous support layer 314 and the second fibrous support layer 316 help hold the filtration layer 312 in a waved configuration to maintain separation of peaks P and troughs of adjacent waves of the filtration layer. Any layer of the multilayer laminate media construction 310 can be charged or uncharged. Although the first fibrous support layer is shown adjacent the first side 320, and the second fibrous support layer is shown adjacent the second side 322, it should be understood that other layers can be provided between the filtration layer and the fibrous support layers.

In the illustrated multilayer laminate media construction 310, the first fibrous support layer 314 is provided upstream of the filtration layer 312, and the second fibrous support layer 316 is provided downstream of the filtration layer. The first and second fibrous support layers 314 and 316, either alone or in combination, can help maintain the waved configuration of the filtration layer 312. While two fibrous support layers 314 and 316 are shown, the filtration media 310 need not include both support layers 314 and 316. Where only one support layer is provided, the support layer can be disposed upstream or downstream of the filtration layer.

The multilayer laminate media construction 310 includes one or more outer or cover layers located on the upstreammost and/or downstream-most sides of the filter media 310. The multilayer laminate media construction 310 can include a cover layer 318 and/or a cover layer 319. The cover layer 318 can be provided upstream of the filtration layer 312, and the cover layer 319 can be provided downstream of the filtration layer 312. The cover layers 318 and 319 can be provided to help hold the filtration layer 312 in a waved configuration. In addition, the cover layers 318 and 319 can help with dust loading, can help provide a more pleasing look to the filter media 310, and can help protect the filtration layer 312. The multilayer laminate media construction 310 can include a first outer fibrous layer 330, and may contain a second outer fibrous layer 332. In general, the first outer fibrous layer 330 can be provided adjacent and covering the cover layer 318. If present, the second outer fibrous layer 332 can be provided adjacent and covering the second the second cover layer 319.

In general, the components of the multilayer laminate media construction 310, the methods of manufacturing the multilayer laminate media construction 310, and the dimensions of the multilayer laminate media construction 310 can be provided as described for the for the corresponding structure of the multilayer media laminate construction 210. In addition, the first outer fibrous layer 330 and the second outer fibrous layer 332 can be provided from the components and in the manner and with the dimensions described for the first fibrous support layer 214 and the second fibrous support layer 216, and can be attached to the cover layers 318 and 319 in the same way the fibrous support layers 214 and 216 are attached to the filtration layer 212.

The support layers 314 and 316 extend across the peaks P and into the troughs T so that the support layers 314 and 316 also have waved configurations. A person skilled in the art will appreciate that a peak P on one side of the fine fiber filtration layer 312 will have a corresponding trough T on the other side. Thus, the upstream support layer 314 will extend into a trough T, and exactly opposite that same trough T is a peak P, across which the downstream support layer 316 will extend. Since the upstream support layer 314 extends into the troughs T on the upstream side of the fine fiber filtration layer 312, the upstream layer 314 will maintain adjacent peaks P on the upstream side at a distance apart from one another and will maintain adjacent troughs T on the upstream side at a distance apart from one another. The downstream support layer 316, if provided, can likewise maintain adjacent peaks P on the downstream side of the fine fiber filtration layer 312 at a distance apart from one another and can maintain adjacent troughs T on the downstream side of the fine fiber filtration layer 312 at a distance apart from one another. As a result, the fine fiber filtration layer 312 has a surface area that is significantly increased, as compared to a surface area of the fine fiber filtration layer in the planar configuration. In certain exemplary embodiments, the surface area in the waved configuration is increased by at least about 50%, and in some instances as much as 120%, as compared to the surface area of the same layer in a planar configuration. The increased surface area leads to an increased filtration efficiency.

It should be understood that the multilayer laminate media construction 310 can be provided with one or both of the first outer fibrous layer 330 and the second outer fibrous layer 332. When the first outer fibrous layer 330 is present, then the first cover 318 can be present. Similarly, when the second outer fibrous layer 332 is present, then the second cover 319 can be present. It should also be understood that multilayer laminate media can be provided wherein the first cover 318 is omitted even though the first fibrous layer 330 is present, and the multilayer laminate media can be provided wherein the second cover 319 is omitted even though the second fibrous outer 332 is present.

XII. Pleated Media Pack and Filter Elements

The multilayer laminate media construction can be formed into pleated media arrangements. FIG. 24 shows a pleated media arrangement 400 of a multilayer laminate media construction 402. The solid line 404 represents, for example, the portion of the multilayer laminate media construction 210 or 310 without the outermost fibrous layer indicated at reference numbers 214, 216, 330, and 332. The outermost fibrous layer is indicated at reference number 408. In the case of the multilayer laminate media construction 210, the first fibrous support layer 214 and the second fibrous support layer 216 can be represented by the outermost fibrous layer 408. In the case of the multilayer media construction 310, the first outer fibrous layer 330 and the second outer fibrous layer 332 can be represented by the outermost fibrous layer 408. As illustrated in FIG. 24, the outermost fibrous layer 408 located on opposing pleat faces 410 and 412 extending between pleat tips 414 and 416 touch along a length L of the opposing pleat faces 410 and 412 for a sufficient length to help hold the pleated media arrangement 400 in a pleated configuration. The length that the outermost fibrous layer 408 of opposing pleat faces 410 and 412 can touch in order to help hold the pleated media arrangement 400 in a pleated configuration can be at least 20% of the pleat depth L defined by the distance between opposing pleat tips 414 and 416. Where touching, the outermost fibrous layer 408 of opposing pleat faces 410 and 412 can be provided as bonded together by thermal or chemical techniques. Thermal techniques include heating so that the fibers bond together. Chemical techniques include using adhesive to bond the fibers together.

Figure 25:
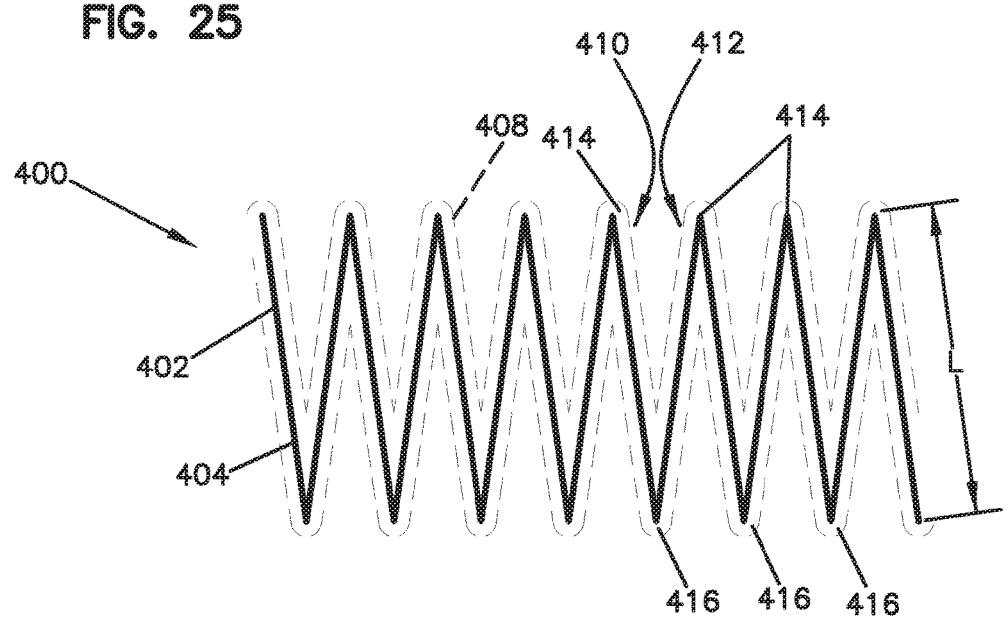
FIG. 25 is an illustration of a pleated media pack.
Figure 26:
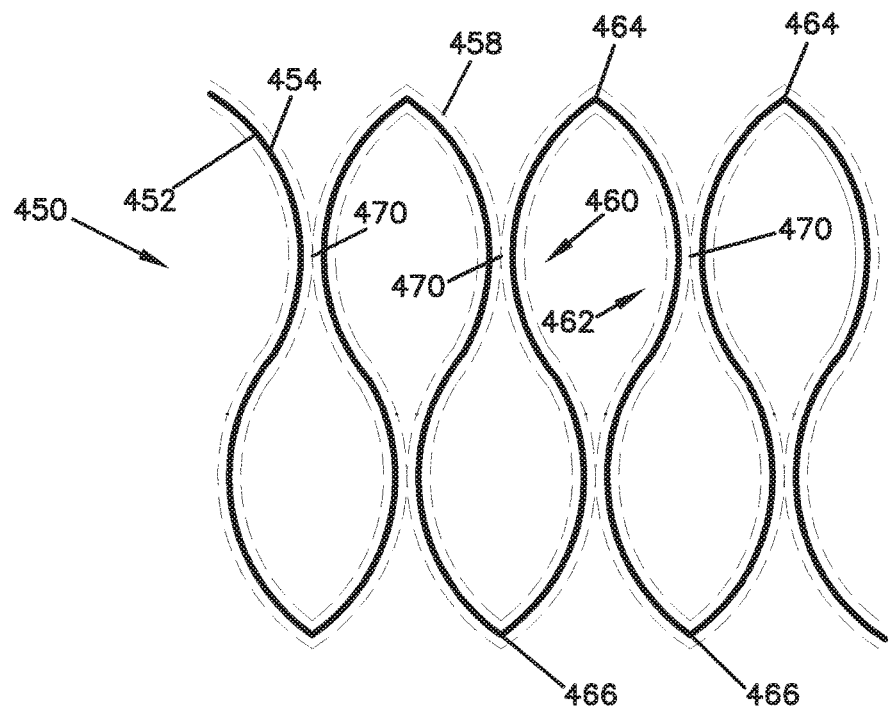
FIG. 26 is an illustration of a pleated media pack.

Now referring to FIG. 25, an alternative pleated media arrangement 450 of a multilayer laminate media construction 452 is shown. The solid line 454 represents, for example, the multilayer laminate media construction 210 or 310 without the outermost fibrous layer indicated at reference numbers 214, 216, 330, and 332. The outermost fibrous layer is indicated at reference number 458. In the case of the multilayer laminate media construction 210, the first fibrous support layer 214 and the second fibrous support layer 216 can be represented by the outermost fibrous layer 458. In the case of the multilayer media construction 310, the first outer fibrous layer 330 and the second outer fibrous layer 332 can be represented by the outermost fibrous layer 458. As illustrated in FIG. 25, the outermost fibrous layer 458 located on opposing pleat faces 460 and 462 extending between pleat tips 464 and 466 touch along a length of the opposing pleat faces 460 and 462 for a sufficient length to help hold the pleated media arrangement 450 in a pleated configuration. Because of the way the pleats in the pleated media arrangement 450 are deformed, the location where the outermost fibrous layer 458 of opposing pleat faces 460 and 462 is located away from the opposing pleat tips 464 and 466. The pleated media arrangement 450 can be characterized as having areas higher outer fiber density 470 located spaced from the opposing pleat tips 464 and 466 and providing a location which helps hold the pleated media arrangement 450 in its shape. Where touching, the outermost fibrous layer 408 of opposing pleat faces 410 and 412 can be provided as bonded together by thermal or chemical techniques. Thermal techniques include heating so that the fibers bond together. Chemical techniques include using adhesive to bond the fibers together.

Figure 27A:
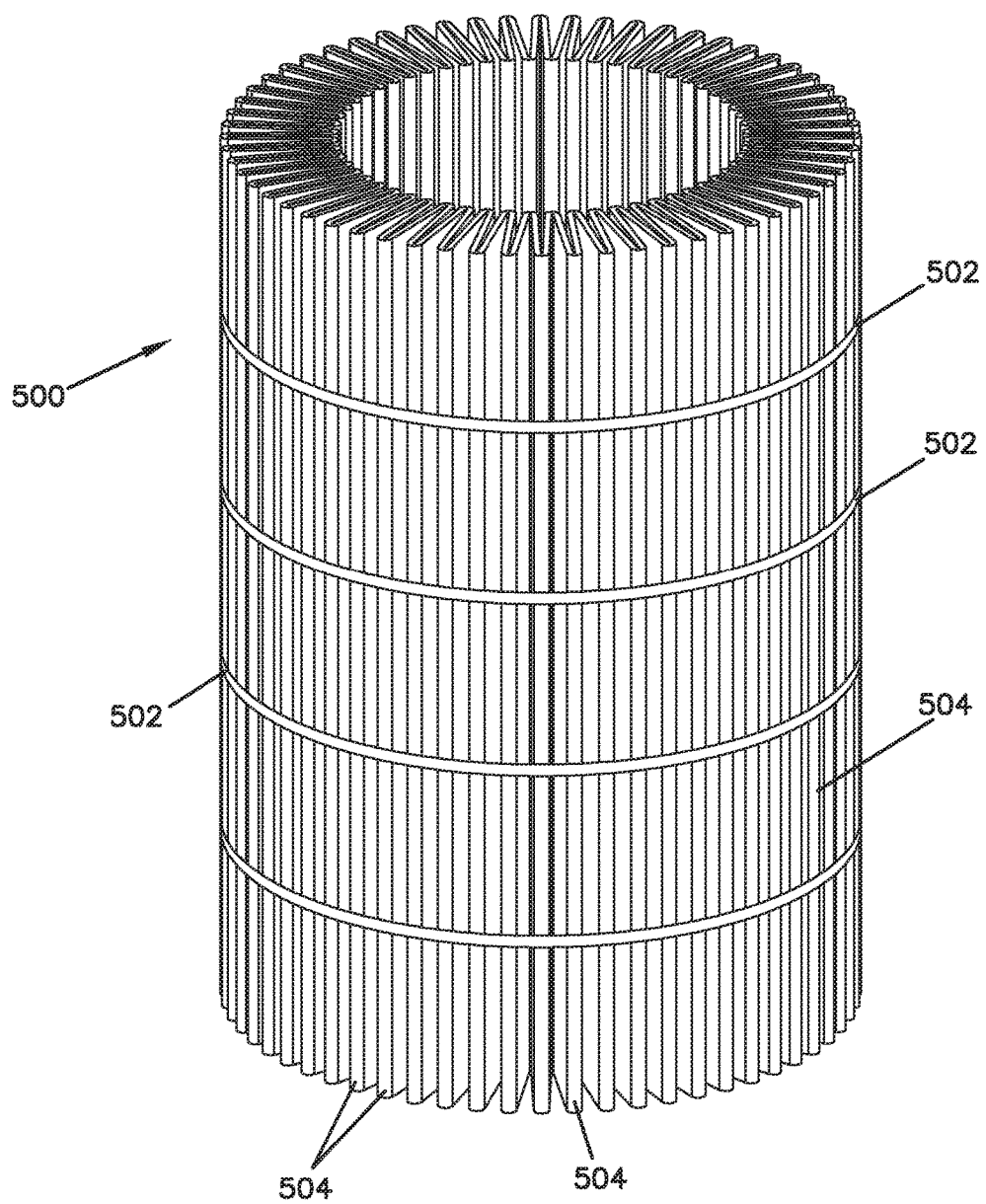
FIGS. 27A-E show pleated media packs with exemplary spacers.
Figure 27B:
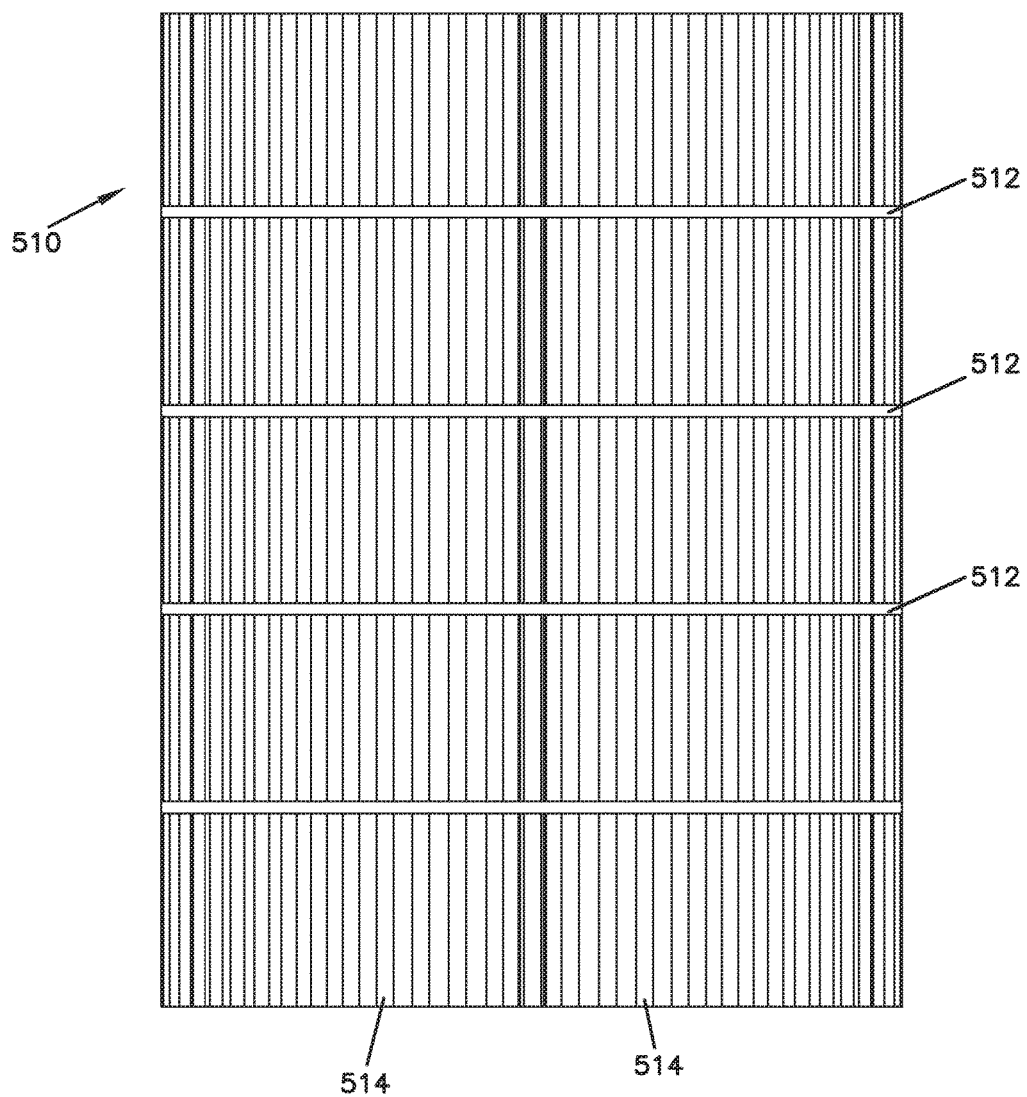
Figure 27C:
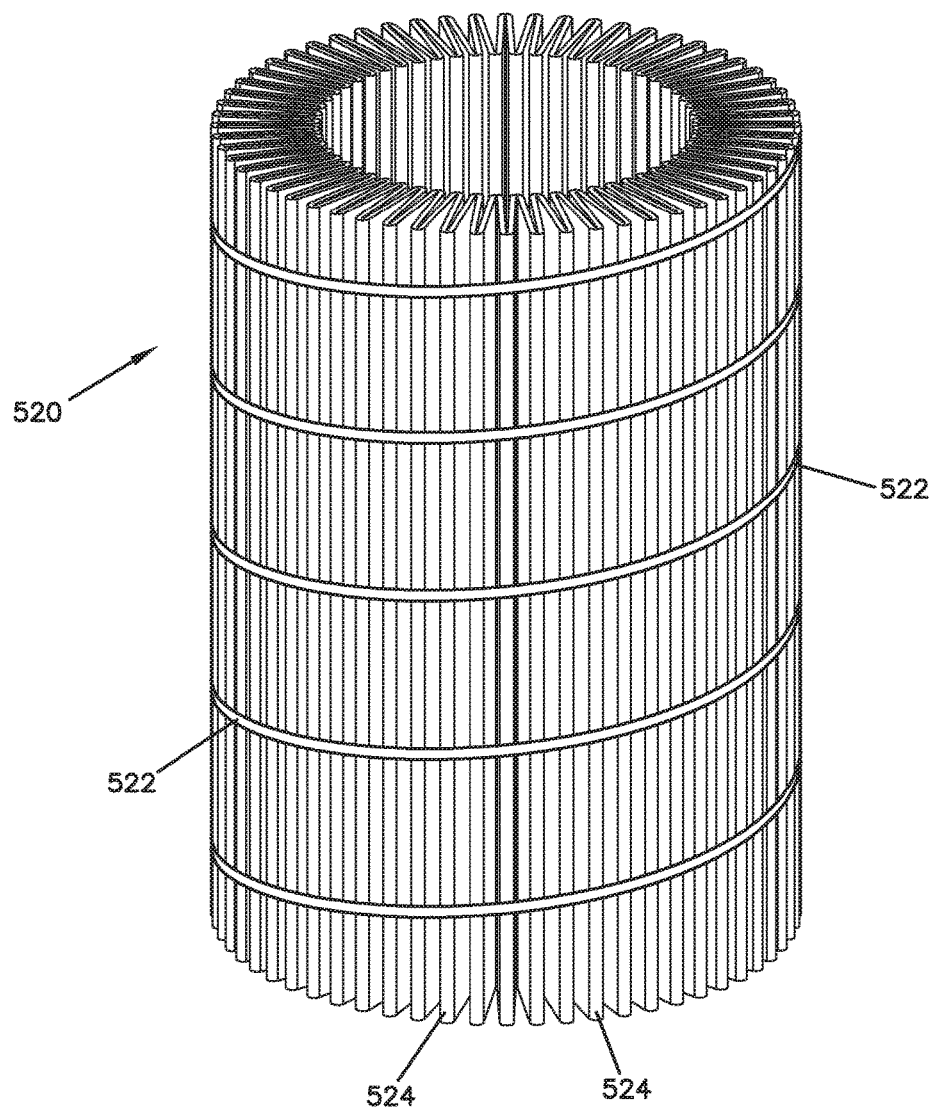
Figure 27D:
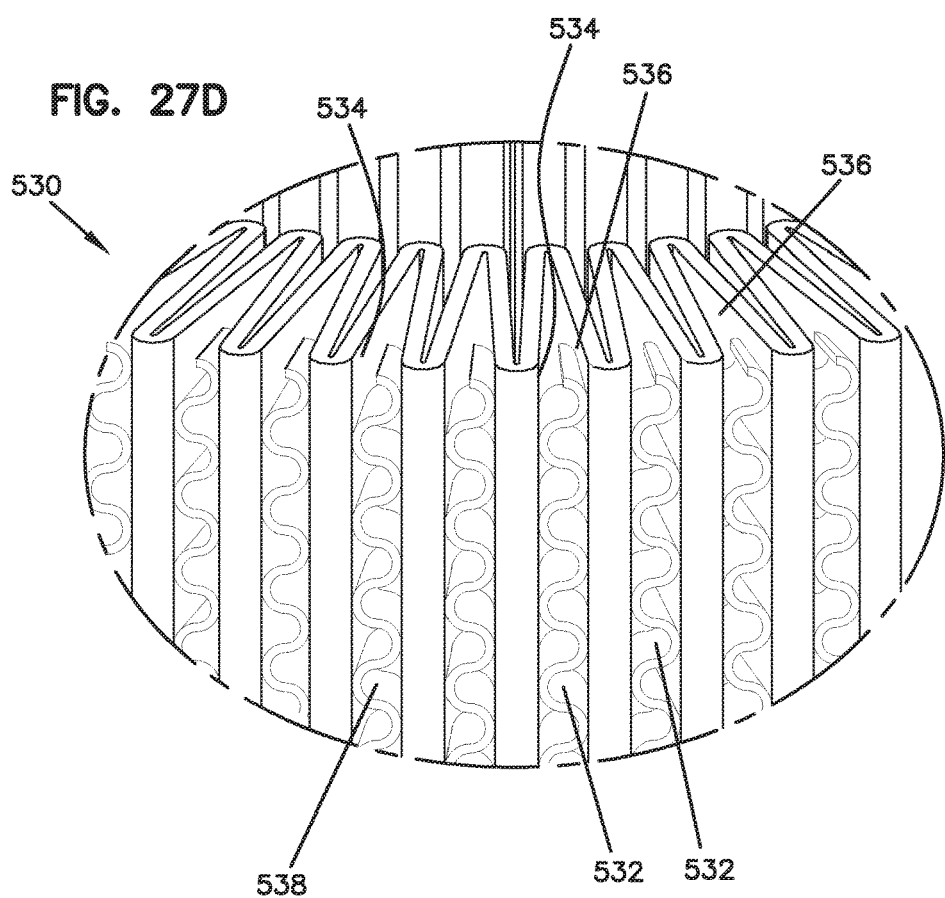
Figure 27E:
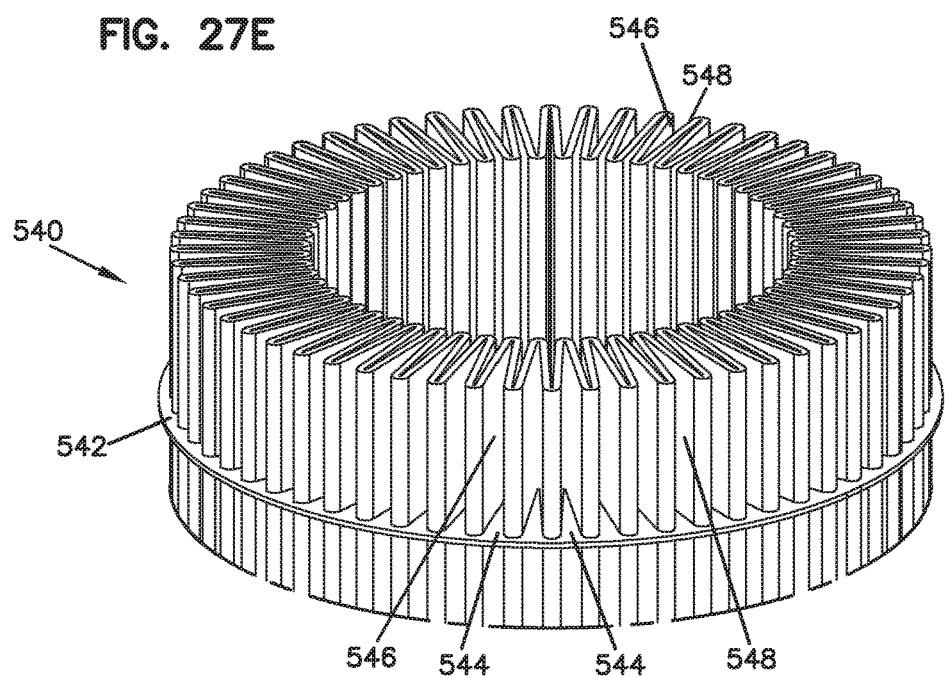

Now referring to FIGS. 27A-27C, pleated media packs are illustrated using exemplary pleat spacers in combination with the multilayer laminate media 210 and 310 arranged in pleated configurations. FIG. 27A illustrates a pleated closed loop media pack 500 having adhesive beads 502 extending across pleat tips 504. FIG. 27B illustrates a pleated panel filter media pack 510 having adhesive beads 512 extending across pleat tips 514. FIG. 27C illustrates a pleated closed loop media pack 520 having roving 522 extending across pleat tips 524. The roving 522 can include a permeable material or a non-permeable material. FIG. 27D illustrates a pleated media pack 530 containing corrugated members 532 located between opposing pleat faces 534 and 536. The corrugated members 532 can be provided as tapered corrugated members 538 that fit better between the opposing pleat faces 534 and 536. FIG. 27E illustrates a pleated media pack 540 containing at least one comb member 542 that includes teeth 544 extending between opposing pleat faces 546 and 548 to keep the pleat faces separated. It is pointed out that the corrugated members and the comb members can be used in pleated panel filters such as the one shown in FIG. 27B.

FIG. 28 illustrates a filter element 600 containing media that can be the multilayer laminate media 602 (for example, the multilayer laminate media 210 and 310) and wherein the media 602 is arranged in a pleated configuration 604 and held in place by a frame or molded member 606 (such as a plastic or polymeric material) which can be injection molded in place according to the disclosure of U.S. Patent Publication No. US 2014/0144112, the entire disclosure of which is incorporated herein by reference. For example, the pleated configuration 604 can be placed in a mold and the frame or molded member 606 can be formed around and into the multilayer laminate media 602. That is, the multilayer laminate media can be held in a pleated configuration by the frame or molded member 606 so that the multilayer laminate media resists deformation into a non-pleated configuration. As a result of the molding (such as by injection molding), the frame or molded member 606 can enter into and become a part of the multilayer laminate media. The filter element can also include a seal member 610 for sealing to a housing. In addition, the multilayer laminate media can the filter element can have a first end cap 612 having a central aperture 614, and a second end cap 616 having a closed end 618.

XIII. Some Selected Characterizations

In this summary, some selected summary characterizations of the teachings herein are provided. Among what may be claims is:

1. A filter element comprising:
   (a) a media pack arrangement having first and second opposite ends, said media pack arrangement comprising:
   (i) an inner liner defining a safety central open volume;
   (ii) a multilayer laminate media construction circumscribing the inner liner and having a first end and a second end, wherein the multilayer laminate media construction comprises:
   (A) a filtration media layer arranged in a waved configuration, wherein the filtration media layer has a first side and a second side;
   (B) a first fibrous support layer adjacent the first side of the filtration media layer arranged in the waved configuration;
   (b) a first end cap at the first end of the media pack arrangement; said first end cap having a central aperture in flow communication with said safety central open volume; and
   (c) a second end cap at the second end of the media pack arrangement; said second end cap being a closed end cap.

2. A filter element according to claim 1, wherein the first end cap is molded onto the first end of the media pack arrangement and seals the first end of the multilayer laminate media construction.

3. A filter element according to any one of claims 1-2, wherein the second end cap is molded onto the second end of the media pack arrangement and seals the second end of the multilayer laminate media construction.

4. A filter element according to any one of claims 1-3, wherein inner liner comprises a cylindrically arranged screen.

5. A filter element according to claim 4, wherein the cylindrically arranged screen is formed from a plastic material.

6. A filter element according to claim 4, wherein the cylindrically arranged screen is formed from a metal material.

7. A filter element according to any one of claims 1-6, wherein the multilayer laminate media construction further comprises a cover layer adjacent the first fibrous support layer.

8. A filter element according to claim 7, wherein the cover layer is arranged adjacent the inner liner.

9. A filter element according to any one of claims 1-8, wherein the multilayer laminate media construction is bonded to the inner liner.

10. A filter element according to any one of claims 1-9, wherein the multilayer laminate media construction further comprises a second fibrous support layer adjacent the second side of the filtration media layer arranged in the waved configuration.

11. A filter element according to claim 7, wherein the multilayer laminate media construction further comprises a second fibrous support layer adjacent the second side of the filtration media layer arranged in the waved configuration.

12. A filter element according to claim 11, wherein the multilayer laminate media construction further comprises a second cover layer adjacent the second support layer.

13. A filter element according to any one of claims 1-12, wherein the filtration media layer provides at least 1 wave per linear inch.

14. A filter element according to any one of claims 1-13, wherein the filtration media layer provides about 2 to about 6 waves per linear inch.

15. A filter element according to any one of claims 1-14, wherein the filtration media layer comprises a layer of fibers having an average diameter of less than 10 microns.

16. A filter element according to claim 15, wherein the filtration media layer has a thickness of about 2 mils to about 30 mils.

17. A filter element according to claim 16, wherein the filtration media layer arranged in the waved configuration has a thickness of 0.1 mil to 2 mils.

18. A filter element according to any one of claims 1-17, wherein the multilayer laminate media construction has a Frazier air permeability in a range of about 75 ft/min to about 200 ft/min when measured clean and non-oiled at 0.5 inch water column restriction according to ASTM D737.

19. A filter element according to any one of claims 1-18, wherein the first fibrous support layer comprises fibers having an average fiber diameter of 5 μm to 40 μm and an air permeability of 300 CFM to 1000 CFM.

20. A filter element according to any one of claims 1-19, wherein the multilayer laminate media construction has a thickness of about 1.5 mm to about 25 mm, a basis weight of about 70 gsm to about 1100 gsm, and a dust holding capacity of at least 8 g/ft$^2$.

21. A filter element according to any one of claims 1-20, wherein the multilayer laminate media construction comprises a seam extending from the multilayer laminate media construction first end to the multilayer laminate media construction second end.

22. A filter element according to claim 21, wherein the seam comprises overlapping portions of the laminated media construction welded together.

23. A filter element according to claim 21, wherein the seam comprises a result of heating and pressing an overlap of the multilayer laminate media construction.

24. A filter element according to any one of claims 1-23, wherein the filtration media layer comprises a single non-woven layer.

25. A filter element according to any one of claims 1-24, wherein the filtration media layer comprises multiple layers.

26. A filter element according to claim 25, wherein one of the multiple layers comprises a non-woven layer and one of the multiple layers comprises a membrane.

27. A filter element according to any one of claims 1-24, wherein the filtration media layer comprises a membrane.

28. A filter element according to any one of claims 1-27, wherein the multilayer laminate media construction has a DOP filtration efficiency of about 10 to about 50.

29. An air cleaner comprising:
(a) a housing having an outer wall, and open end for insertion and removal of a primary filter element and a secondary filter element, and an air flow outlet tube;
(b) a primary filter element positioned within the housing and comprising:
(i) a media pack having first and second, opposite, ends; said media pack defining a central open volume;
(ii) a first end cap at said first end of said media pack; said first end cap having a central aperture in flow communication with said central open volume;
(iii) a closed end cap at said second end of said media pack; said closed second end cap having a closed central region;
(c) a safety filter element positioned within the central open volume of the primary filter element, the safety filter element comprising a media pack arrangement having first and second opposite ends, said media pack arrangement comprising a multilayer laminate media construction defining a safety central open volume and having a first end and a second end, wherein the multilayer laminate media construction comprises:
(i) a filtration media layer arranged in a waved configuration, wherein the filtration media layer has a first side and a second side;
(ii) a first fibrous support layer adjacent the first side of the filtration media layer arranged in the waved configuration;
(iii) a first end cap at the first end of the media pack arrangement; said first end cap having a central aperture in flow communication with said safety central open volume; and
(iv) a second end cap at the second end of the media pack arrangement; said second end cap being a closed end cap; and
(d) an air cleaner access cover removably positioned over the housing open end.

30. An air cleaner according to claim 29, wherein the multilayer laminate media construction has a Frazier air permeability in a range of about 75 ft/min to about 200 ft/min when measured clean and non-oiled at 0.5 inch water column restriction according to ASTM D737.

31. An air cleaner according to any one of claims 29-30, wherein the filtration media layer arranged in the waved configuration provides at least 1 wave per linear inch 32. A filter pack comprising:
(a) filter media provided in a pleated configuration comprising alternating first and second pleat tips, and pleat faces extending between the alternating first and second pleat tips; and
(b) multilayer laminate media construction extending between, and forming, the alternating first and second pleat tips, the multilayer laminate media construction comprising:
(i) a filtration media layer arranged in a waved configuration, wherein the filtration media has a first side and a second side;
(ii) a first fibrous support layer adjacent the first side of the filtration media layer;
(iii) a first scrim layer having a first side and a second side and wherein the scrim layer first side faces the first fibrous support layer; and
(iv) a first fibrous outer layer adjacent the second side of the first scrim layer.

33. A filter media pack according to claim 32, wherein the pleated configuration is arranged so that the pleated configuration resists deformation into a non-pleated configuration.

34. A filter media pack according to any one of claims 32-33, wherein the pleated configuration is heat set.

35. A filter media pack according to any one of claims 32-34, wherein the pleated configuration is held in place by at least one pleat spacer.

36. A filter media pack according to claim 35, wherein the pleat spacer comprises a hot melt bead, roving, corrugated member, or comb member.

37. A filter media pack according to claim 35, wherein the pleat spacer comprises an injection molded member that holds the pleated configuration.

38. A filter media pack according to claim 37, wherein the multilayer laminate media is provided in a closed loop configuration, and the injection molded member is molded into the pleat faces of the multilayer laminate media.

39. A filter media pack according to any one of claims 32-34, wherein the pleated configuration is held in place by ribbon/string pleating.

40. A filter media pack according to any one of claim 32-39, wherein waves of the filtration media arranged in a waved configuration extend in a direction parallel to the direction of the first and second pleat tips.

41. A filter media pack according to any one of claims 32-40, wherein the multilayer laminate media construction has a frazier air permeability in a range of about 75 ft/min to about 200 ft/min when measured clean and non-oiled at 0.5 inch water color column restriction according to ASTM D737.

42. A filter media pack according to any one of claims 32-41, wherein the filtration media arranged in a waved configuration has at least 1 wave per linear inch.

43. A filter media pack according to any one of claims 32-42, wherein the filtration media arranged in a waved configuration has about 2 to about 6 waves per linear inch.

44. A filter media pack according to any one of claims 32-43, wherein the distance from the first pleat tip to the second pleat tip comprising a pleat depth, and at least 20% of the pleat depth comprises a fiber depth formed by the first fibrous outer layer.

45. A filter media pack according to any one of claims 32-44, further comprising a second fibrous support layer adjacent the second side of the filtration media layer.

46. A filter media pack according to claim 45, further comprising a second scrim layer having a first side and a second side and wherein the scrim layer first side faces the second fibrous support layer, and a second fibrous outer layer adjacent the second side of the second scrim layer 47. A filter media pack according to claim 46, wherein a distance from the first pleat tip to the second pleat tip comprises a pleat depth, and at least 20% of the pleat depth comprises a first fiber depth formed by the first fibrous outer layer, and at least 20% of the pleat depth comprises a second fiber depth formed by the second fibrous outer layer.

48. A filter media pack according to claim 47, wherein the first fibrous outer layer within the fibrous depth comprises fiber bonded to each other, and the second fibrous outer layer within the fibrous depth comprises fiber bonded to each other.

49. A filter media pack according to claim 48, wherein the fibers bonded to each other are heat bonded.

50. A filter media pack according to any one of claims 32-49, wherein the filter media provided in the pleated configuration is arranged in a panel configuration.

51. A filter media pack according to any one of claims 32-50, wherein the filter media provided in the pleated configuration is arranged in a closed loop.

52. A filter media pack according to claim 51, wherein the closed loop comprises a cylindrical configuration or a conical configuration.

53. A filter media pack according to claim 51, wherein the multilayer laminate media construction comprises a weld between overlapping portions of the multilayer media construction.

54. A filter media pack according to any one of claims 32-53, wherein the filter pack exhibits less than 0.008 grams/CFM tested with ISO Fine dust per ISO 12103-A2, tested per IOS 5011 test method, and tested to 50 inches water terminal restriction at 50-600 feet per minutes media face velocity.

55. A filter media pack according to any one of claims 32-54, wherein the multilayer media construction is provided in a closed loop configuration having a first end and a second end, and the first end of the closed loop configuration comprises a first end cap having a central aperture, and the second end of the closed loop configuration comprises a second end cap being a closed end cap.

56. A filter pack comprising:
(a) filter media provided in a pleated configuration comprising alternating first and second pleat tips, and pleat faces extending between the alternating first and second pleat tips; and
(b) multilayer laminate media construction extending between, and forming, the alternating first and second pleat tips, the multilayer laminate media construction comprising:
(i) a filtration media layer arranged in a waved configuration, wherein the filtration media has a first side and a second side;
(ii) a first fibrous support layer adjacent the first side of the filtration media layer;
(iii) wherein the pleated configuration is held in place by at least one pleat spacer.

57. A filter media pack according to claim 56, wherein the pleat spacer comprises a hot melt bead, roving, corrugated member, or comb member.

58. A filter media pack according to claim 56, wherein the pleat spacer comprises an injection molded member that holds the pleated configuration.

59. A filter media pack according to claim 58, wherein the multilayer laminate media is provided in a closed loop configuration, and the injection molded member is molded into the pleat faces of the multilayer laminate media.

60. A filter media pack according to any one of claims 56-59, wherein the pleated configuration is heat set.

The principles, techniques, and features described herein can be applied in a variety of systems, and there is no requirement that all of the advantageous features identified be incorporated in an assembly, system or component to obtain some benefit according to the present disclosure. In addition, the dimensions characterizing an example system are meant to indicate a usable construction, and variations from them are possible.

What is claimed is:

1. A filter element comprising:
   (a) a media pack arrangement having first and second opposite ends, said media pack arrangement comprising:
      (i) an inner liner defining a safety central open volume;
      (ii) a multilayer laminate media construction circumscribing the inner liner and having a first end and a second end, wherein the multilayer laminate media construction comprises:
         (A) a filtration media layer arranged in a waved configuration, wherein the filtration media layer has a first side and a second side;
         (B) a first fibrous support layer adjacent the first side of the filtration media layer arranged in the waved configuration;
         (C) a cover layer adjacent the first fibrous support layer; and
         (D) the multilayer laminate media construction comprises a seam extending from the multilayer laminate media construction first end to the multilayer laminate media construction second end, and wherein the seam comprises overlapping portions of the multilayer laminate media construction welded together; and
      (iii) wherein the cover layer lays continuously along a perimeter of the inner liner;
   (b) a first end cap at the first end of the media pack arrangement; said first end cap having a central aperture in flow communication with said safety central open volume; and
   (c) a second end cap at the second end of the media pack arrangement; said second end cap being a closed end cap.

2. A filter element according to claim 1, wherein the first end cap is molded onto the first end of the media pack arrangement and seals the first end of the multilayer laminate media construction.

3. A filter element according to claim 1, wherein the second end cap is molded onto the second end of the media pack arrangement and seals the second end of the multilayer laminate media construction.

4. A filter element according to claim 1, wherein the multilayer laminate media construction is bonded to the inner liner.

5. A filter element according to claim 1, wherein the multilayer laminate media construction further comprises a second fibrous support layer adjacent the second side of the filtration media layer arranged in the waved configuration.

6. A filter element according to claim 1, wherein the multilayer laminate media construction further comprises a second fibrous support layer adjacent the second side of the filtration media layer arranged in the waved configuration.

7. A filter element according to claim 6, wherein the multilayer laminate media construction further comprises a second cover layer adjacent the second support layer.

8. A filter element according to claim 1, wherein the filtration media layer provides at least 1 wave per linear inch.

9. A filter element according to claim 1, wherein the filtration media layer provides about 2 to about 6 waves per linear inch.

10. A filter element according to claim 1, wherein the seam comprises a result of heating and pressing an overlap of the multilayer laminate media construction.

11. A filter element according to claim 1, wherein the filtration media layer comprises a single non-woven layer.

12. A filter element according to claim 1, wherein the filtration media layer comprises multiple layers.

13. A filter element according to claim 12, wherein one of the multiple layers comprises a non-woven layer and one of the multiple layers comprises a membrane.

14. A filter element according to claim 1, wherein the filtration media layer comprises a membrane.

* * * * *